US012686397B1

(12) United States Patent
Bojinov et al.

(10) Patent No.: US 12,686,397 B1
(45) Date of Patent: Jul. 21, 2026

(54) DETECTING AND RESPONDING TO VEHICLE SENSOR DATA INACCURACIES

(71) Applicant: Zoox, Inc., Foster City, CA (US)

(72) Inventors: Hristo Iankov Bojinov, Palo Alto, CA (US); Stephen Edwin Crozier, Fremont, CA (US); John Sgueglia, Cambridge, MA (US)

(73) Assignee: Zoox, Inc., Foster City, CA (US)

( * ) Notice: Subject to any disclaimer, the term of this patent is extended or adjusted under 35 U.S.C. 154(b) by 326 days.

(21) Appl. No.: 18/199,011

(22) Filed: May 18, 2023

(51) Int. Cl.
*B60W 50/02* (2012.01)
*B60W 60/00* (2020.01)

(52) U.S. Cl.
CPC . *B60W 50/0205* (2013.01); *B60W 2050/0215* (2013.01); *B60W 60/0015* (2020.02); *B60W 2554/4041* (2020.02)

(58) Field of Classification Search
CPC ......... B60W 50/0205; B60W 60/0015; B60W 2050/0215; B60W 2554/4041
See application file for complete search history.

(56) References Cited

U.S. PATENT DOCUMENTS 10,310,509 B1 * 6/2019 Ferguson .............. B60W 10/18
11,747,480 B2 * 9/2023 Goldstein ............... G01S 17/04
356/5.01

2011/0026779 A1 * 2/2011 Matsumoto .............. G09B 7/02
382/118
2017/0278323 A1 * 9/2017 Gupta ................... B60W 50/14
2019/0009785 A1 * 1/2019 Lawrenson ............. G08G 1/166
2020/0019173 A1 * 1/2020 Chen .................... G05D 1/0285
2020/0098394 A1 * 3/2020 Levinson ............... G06V 20/56
2021/0163021 A1 * 6/2021 Frazzoli ................. H04W 4/48
2021/0201464 A1 * 7/2021 Tariq ..................... G06V 20/56
2022/0242451 A1 * 8/2022 Hammoud ........... G08G 1/0133
2023/0015771 A1 * 1/2023 Nassi .................... G06V 20/58
2023/0056233 A1 * 2/2023 Cyr ..................... H04W 12/009
2023/0373498 A1 * 11/2023 Schröder .......... B60W 50/0097
2023/0386326 A1 * 11/2023 Schneemann .......... G06V 40/20
2024/0331449 A1 * 10/2024 Cintas .................... G06V 40/20
2024/0383501 A1 * 11/2024 Khamis ................. B60Q 5/005
2025/0095373 A1 * 3/2025 Monteuuis ............. G06V 20/52

* cited by examiner

*Primary Examiner* — Christopher George Fees
(74) *Attorney, Agent, or Firm* — Lee & Hayes, P.C.

(57) ABSTRACT

Sensor data captured by multiple vehicle sensors may be analyzed and compared to detect sensor attacks and/or other sensor anomalies. Vehicle systems described herein may determine overlapping regions in the fields of view of multiple sensors of a vehicle, including sensors of the same or different modalities. The sensor outputs from the overlapping regions may be compared to determine when a sensor output is unexpected based on the outputs of overlapping sensors. When an unexpected sensor output is detected, the vehicle systems may analyze the sensor data to determine whether the cause of the unexpected sensor output is benign or a potential malicious attack on a sensor or group of sensors. The vehicle systems also may determine and perform responses of the vehicle to various sensor anomalies, including controlling the vehicle to avoid potential threats and/or capturing additional sensor data relating to the causes of the sensor anomalies.

20 Claims, 8 Drawing Sheets

IMAGE 502

LASER 506

PEDESTRIAN 504

200

300

SECOND IMAGE
SENSOR DATA 404

FIRST IMAGE
SENSOR DATA 402

PEDESTRIAN 406

FIRST LIDAR
SENSOR DATA 408

LASER INTERFERENCE 412

SECOND LIDAR
SENSOR DATA 410

VEHICLE 414

VEHICLE 416

IMAGE 502

LASER 506

PEDESTRIAN 504

IMAGE 508
(TIME = T₁)

IMAGE 510
(TIME = T₂)

PLASTIC BAG
514

PEDESTRIAN
512

PEDESTRIAN
512

800 ⟶

DETECTING AND RESPONDING TO VEHICLE SENSOR DATA INACCURACIES

BACKGROUND

Data captured by the sensors of a vehicle within an environment may be used by the vehicle systems to assist in navigation and obstacle avoidance as the vehicle moves through the environment. For example, cameras, lidar and radar sensors, and various other sensors may capture sensor data that the vehicle can use in real time to determine driving routes and avoid roadway obstructions. However, the quality and/or usefulness of the data collected by vehicle sensors may be degraded or corrupted in various circumstances, such as via interference by bad actors in an environment, objects occluding the vehicle sensors, or based on internal errors or malfunctions occurring within the sensors themselves. In these cases, the data collected by the vehicle sensors may be suboptimal or even unsuitable for use, potentially impacting vehicle navigation, obstacle detection and avoidance, and other vehicle functions that rely on the sensor data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
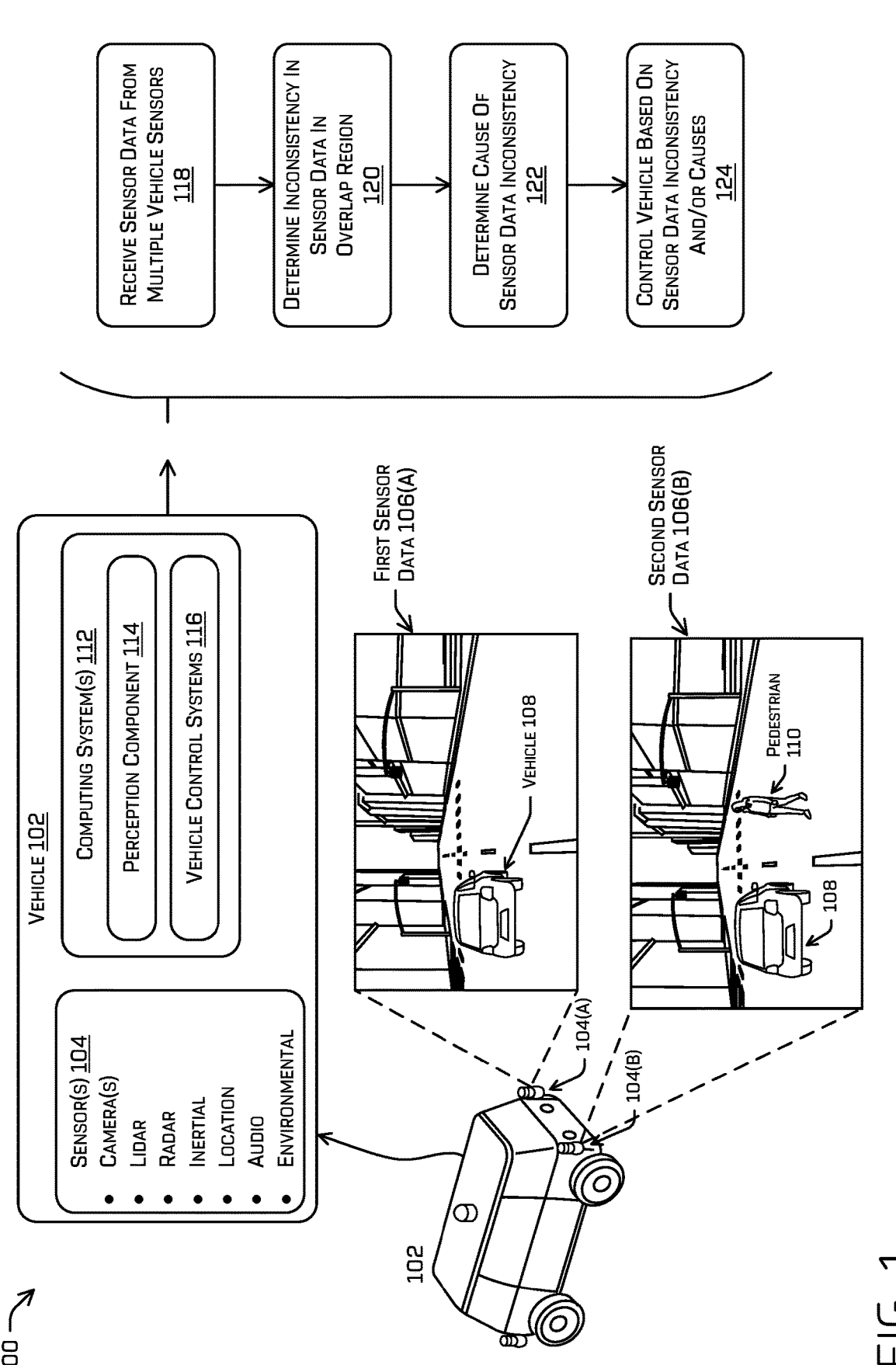
FIG. 1 illustrates an example technique using a perception component of a vehicle to determine and respond to sensor data inaccuracies, in accordance with one or more examples of the disclosure.

As discussed above, the quality and/or usefulness of sensor data collected by vehicle sensors may become degraded or corrupted in certain circumstances, including based on environmental factors, sensor malfunctions, and/or interference in the operation of the sensors by objects in the environment. When objects in the environment interfere with vehicle sensors, the interference may be intentional or unintentional, malicious or benign. The techniques described herein relate to detecting inaccuracies in the sensor data captured by a vehicle sensor, based on inconsistencies between the sensor data and additional sensor data captured by other sensors of the vehicle. In various examples, a perception component of the vehicle may determine regions of overlap between the fields of view of different vehicle sensors. Within the overlap regions, the perception component may compare the sensor data to determine inconsistencies between different vehicle sensors, which may represent an inaccuracy in the sensor data from one or more of the vehicle sensors.

Additional techniques described herein relate to determining the causes of inaccuracies in the vehicle sensor data, as well as determining responses to be performed by the vehicle control systems based on the sensor data inaccuracies and causes. A number of techniques are described herein for determining causes of inaccuracies of the vehicle sensor data, including using machine-learned (ML) models and/or heuristics to detect objects in the environment that may be interfering with the sensors, as well as performing various remedial actions and determining the responsiveness (or non-responsiveness) of the sensor data inaccuracies to the remedial actions. Based on the characteristics of the sensor data inaccuracies, and/or the causes identified for the inaccuracies, the perception component may determine a number of responsive actions for the vehicle to perform. Examples of responsive actions to perform based on sensor data inaccuracies may include, but are not limited to, modifying the driving route, modifying a trajectory followed by the vehicle to traverse the driving route, and/or modifying driving characteristics of the vehicle while traversing the environment. Additionally, when determining that a sensor data inaccuracy is caused by an intentional and/or malicious action of an agent or object in the environment, the responsive actions may include actions to capture additional data relating to the sensor data inaccuracy and its cause, and actions to generate reports and/or alerts based on the intentional or malicious sensor interference.

Thus, the techniques described herein can improve the performance and safe operation of vehicles, autonomous or otherwise, and other computer systems relying on sensor data. For example, these techniques may provide for faster and more accurate detection of sensor data inconsistencies and inaccuracies, as well as improvements in the remediation techniques performed by the vehicle (or other sensor system) to correct or account for sensor data degradations or corruptions. These techniques also may improve the functioning, safety, and efficiency of autonomous and semi-autonomous vehicles operating in driving environments, by determining improved driving trajectories (and/or driving paths) through the environments that take into account sensor data inaccuracies as well as the causes of the inaccuracies which may include threats and potential safety hazards to the vehicle.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In various other examples, the techniques may be utilized in an aviation or nautical context, and may be incorporated into any ground-borne, airborne, or waterborne vehicle using route planning techniques, including those ranging from vehicles that need to be manually controlled by a driver at all times, to those that are partially or fully autonomously controlled.

FIG. 1 depicts an example system 100 and techniques for determining and responding to inaccuracies in the sensor data captured by the sensors of a vehicle 102. In some instances, the vehicle 102 may be an autonomous vehicle configured to operate according to a Level 5 classification issued by the Society of Automotive Engineers (SAE), (and/or the U.S. National Highway Traffic Safety Administration), which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. Additionally, the techniques described herein for detecting degradations and/or corruptions in vehicle sensor data, determining causes, and determining corresponding vehicle control actions may be usable by non-autonomous vehicles as well, including land vehicles, aerial vehicles, marine vehicles, etc. The techniques discussed herein also may apply to non-vehicle sensor-based systems, such as systems for manufacturing, location monitoring and security systems, augmented reality systems, etc.

As shown in this example, vehicle 102 may receive sensor data from various sensors 104 of the vehicle 102. Sensors 104 may include, for example, image sensors (e.g., cameras), lidar sensors, radar sensors, time-of-light sensors, environmental sensors, audio sensors, inertial sensors, sonar sensors, location sensors (e.g., a GPS), and various other sensors configured to capture data representing the external environment around the vehicle 102. For instance, the sensors 104 may include a number of cameras configured to capture image data from various positions and angles relative to the vehicle 102, a number of lidar sensors configured to transmit pulsed lasers for measuring distances to nearby objects around the vehicle 102, and a number of radar sensors configured to use radio waves to detect and determine distances to nearby objects around the vehicle 102.

The sensors 104 of the vehicle 102 may include any number and type of sensors, and may be installed on and/or integrated into the vehicle 102 at various different positions, angles, orientations, etc. For example, the vehicle 102 depicted in FIG. 1 includes a separate cluster of sensors (e.g., a sensor pod) positioned at each corner of the vehicle 102, and a separate sensor or sensor cluster on the roof of the vehicle 102 (e.g., a spinning lidar). Each sensor cluster on the vehicle 102 may include one or more cameras, lidar sensors, and/or radar sensors, as well as other various types of sensors described herein.

Each of the sensors 104 and/or sensor clusters may be of different types or qualities, may be positioned at different locations and/or oriented at different angles on the vehicle. Additionally, each of the sensors 104 may be configured having different fields of view and various different data capture characteristics, such as detection ranges, capture rates, focal lengths, focal points, color capabilities, etc., in order to capture a variety of different sensor data of the environment surrounding the vehicle 102. Sensors 104 thus may include any number of different types of cameras (e.g., common optical or light-based cameras, infrared cameras, thermal imaging cameras, night vision cameras, etc.), different types of lidar systems (e.g., short-range, long-range, various resolutions, roof-mounted spinning lidar, etc.), different types of radar systems (e.g., continuous wave, Doppler, monopulse, various resolutions and ranges, etc.), each of which may be configured to capture sensor data (e.g., images or point clouds) from the environment.

As shown in FIG. 1, sensors 104 may include multiple instances of each of these or other types of sensors. For instance, the lidar sensors may include multiple individual lidar sensors located at the corners, front, back, sides, and/or top of the vehicle 102. The camera sensors may include multiple cameras disposed at various locations about the exterior and/or interior of the vehicle 102. In some examples, different sensors 104 of the same modality (or type) and/or different sensors of different modalities may have at least partially overlapping fields of view. The sensors 104 may provide input to the vehicle computing system(s) 112, and/or may transmit sensor data, via one or more networks to various external computing device(s) and systems at a determined frequency, after a lapse of a predetermined period of time, in near real-time, etc.

Although various examples described herein refer generally to image sensors (e.g., cameras), lidar systems, and radar systems, the sensors 104 of the vehicle 102 may additionally or alternatively include sonar sensors configured to use sound pulses to measure object distances or depths, time-of-flight sensors configured to measure object distance based on time differences between emission of signals and their return to the sensor, or other sensors configured to capture other information about the environment. Further sensors 104 of the vehicle 102 may include ultrasonic transducers, sonar sensors a Global Positioning System (GPS) which receives a location signal (e.g., a GPS signal), as well as movement sensors (e.g., speedometers, compasses, accelerometers, and/or gyroscopes) configured to detect the current location, movement, and orientation of the vehicle 102. Additional sensors 104 may also include magnetometers, wheel encoder sensors, microphones and other audio sensors, as well as environmental and weather sensors (e.g., temperature sensors, light sensors, pressure sensors, rain and precipitation sensors, wind sensors, etc.).

Using data captured by various sensors 104, the vehicle 102 may receive images, lidar and radar point clouds, and/or other sensor data, as the vehicle 102 traverses the environment. As shown in this example, a first sensor 104(A) may capture a first image 106(A) of the environment, and a second sensor 104(B) may capture a second image 106(B) of the environment. In this example, the first image 106(A) may be captured concurrently or around the same time as the second image 106(B), and the fields of view of the two images may at least partially overlap.

As shown in this example, although the first image 106(A) and the second image 106(B) include overlapping views of the environment, there is an inconsistency between the images. The first image 106(A) depicts a vehicle 108 in the driving environment, while the second image 106(B) depicts the same vehicle 108 and a pedestrian 110. Based on the overlapping fields of view between the first sensor 104(A) and the second sensor 104(B), it should be expected that the first image 106(A) would also include pedestrian 110. When the overlapping portions of the first image 106(A) and the second image 106(B) include different sets of objects, and/or have other significant differences, these images may be considered to be inconsistent. Such an inconsistency may indicate that at least one (and possibly both) of the first image 106(A) or the second image 106(B) is inaccurate.

Additional examples of inconsistencies between sensor data from overlapping sensors are described below in more detail.

In some examples, the vehicle 102 may include one or more computing system(s) 112 that include a perception component 114 and/or vehicle control systems 116. As described below in more detail, the perception component 114 may be configured to determine sensor inaccuracies based on the inconsistencies between the overlapping regions of sensor data captured by different sensors, and to determine causes of the sensor inaccuracies. The perception component 114 also may determine one or more responses by the vehicle based on the sensor inaccuracies and/or causes, and may use the vehicle control systems 116 to perform the determined responses.

FIG. 1 also illustrates an example process that may be performed by the perception component 114, alone and/or in conjunction with other components of the vehicle 102, to detect and respond to the various sensor data inaccuracies described herein.

At operation 118, the perception component 114 may receive sensor data captured by multiple sensors 104 of the vehicle 102. As described above, the perception component 114 may receive sensor data from any number of vehicle sensors, including multiple different sensors of different modalities (e.g., cameras, lidar systems, radar systems, etc.) positioned at different locations on the vehicle 102. The different sensors 104 may have different fields of view relative to the vehicle 102, and may be configured to data from different angles, at different resolutions, within different ranges, etc.

At operation 120, the perception component 114 may determine an inconsistency between the sensor data of different sensors 104 by analyzing and comparing the overlapping regions of the sensor data captured by the different sensors 104. To identify an inconsistency between the sensor data of two or more sensors, the perception component 114 initially may determine which sensors 104 on the vehicle 102 have fields of view that overlap with the fields of view of other sensors 104. In some examples, determinations of the sensors 104 that have overlapping fields of view may be predetermined off-vehicle by a separate computing device, based on the specifications of the vehicle 102 (e.g., model type, dimensions, locations of sensors and sensor clusters, etc.) and the sensors (e.g., installation location and angle, detection field sizes, detection ranges, etc.). Based on these specifications, a computing device may determine which sensors 104 may have overlapping fields of view, and which portions of the sensor data captured by the sensors are included in the overlapping regions.

Data defining the overlapping regions between sensor fields of view then may be provided to the vehicle computing system(s) 112 for use by the perception component 114. Such data may indicate that two or more sensors on the vehicle 102 (e.g., sensor 104(A) and sensor 104(B)) have an overlapping field of view, and may include the sizes of the overlapping region with respect to both of the sensors. As a simple example, the overlapping region data provided to and/or determined by the perception component 114 may indicate that the rightmost 15 feet of the images captured by the sensor 104(A) overlaps with the leftmost 15 feet of the images captured by the sensor 104(B). In other examples, the overlapping region data may define the size, shape, and location of the overlapping region (e.g., in length, width, and depth/range dimensions) within the field of view of a first sensor, and the corresponding size, shape, and location of the same overlapping region within the field of view of a second sensor. The sizes, shapes, and locations of overlapping sensor fields of view may be determined, for example, as sizes/shapes/location within the sensor output (e.g., image pixel ranges, regions of lidar or radar point clouds, etc.) or as sizes/shapes/locations of the overlapping region in the physical environment. In either case, the overlapping region data may be defined relative to a particular side or corner of the field of view of the sensor (e.g., a bottom-right corner of the field of view from a first sensor overlaps with a top-left corner of a second sensor, etc.). Additionally, although the example depicted in FIG. 1 shows an overlapping region between two sensors 104(A) and 104(B), in other examples overlapping regions may be determined and compared for three or more sensors 104.

After determining (or receiving) the sensor overlap regions for multiple sensors 104 of the vehicle 102, the perception component 114 may analyze and compare the sensor data in the overlap regions to determine inconsistencies between the sensor data captured by different sensors. In this example, the perception component 114 may determine an inconsistency based on different sets of objects detected within the overlap region of a first sensor 104(A) and a second sensor 104(B). In other examples, the perception component 114 may use any number of techniques to compare the sensor data in the overlapping regions, and to determine when one or more expected objects are not present in the sensor data captured by a first sensor, or vice versa. In some instances, the perception component 114 may receive and compare the raw sensor data from the overlapping regions of multiple sensors 104, such as raw image data, lidar point clouds, radar point clouds, etc. Additionally or alternatively, the perception component 114 may receive and compare processed sensor data captured by the sensors, such as a multi-channel top-down representation or an object-based representation with labels representing agents and other objects in the environment. In examples when the sensor data has been preprocessed and/or labeled prior to the comparison, the perception component 114 may readily compare the overlapping regions from sensors having different modalities, such as comparing a first portion of an image captured by a camera with a second portion of a point cloud captured by a lidar sensor or radar sensor, etc.

To compare an overlapping region of sensor data captured by multiple sensors, the perception component 114 may analyze the overlapping portions captured by each of the sensors 104, to determine whether any inconsistencies are present in the objects represented, the background, and/or other characteristics of the environment as perceived by the sensors 104. When performing a comparison to detect sensor data inconsistencies, the perception component 114 may account for differences in the characteristics of the sensors 104, such as differences in the sensor positions, orientation angles, modalities, and resolutions. For instance, the perception component 114 may use the differences in the positions, orientation angles, and/or resolutions of sensors 104(A) and 104(B) to transform one or both of the first image 106(A) and the second image 106(B), prior to or as part of the comparison. Even after accounting for differences in the sensor positions, angles, modalities, resolutions, etc., it can be expected that minor differences between the sensor data may be detected in the overlap region. Therefore, in some examples, the perception component 114 may determine a sensor data inconsistency only when the differences between the sensor data in the overlap region are significant, such as when at least a threshold amount of the sensor data (e.g., a threshold percentage, number of image pixels or point cloud points, etc.) are significantly different (e.g., greater than a difference magnitude threshold), and/or when at least one an object captured by one sensor is not present in the other sensor data, etc.

In some examples, the perception component 114 determines a sensor data inconsistency between the overlapping regions of two (or more) sensors 104, the inconsistency may be classified as a false negative object detection (e.g., when an object expected to be in the sensor data of a sensor is not detected), or a false positive object detection (e.g., when an unexpected object is detected in the sensor data of a sensor). To determine whether a sensor data inconsistency between two sensors is a false negative object detection by the first sensor or a false positive object detection by the second sensor, the perception component 114 may use additional sensor data, such as data captured by a third sensor on the vehicle 102 and/or previous data captured by any of the sensors 104 at a previous recent point in time. In some examples, the perception component 114 may use these techniques to determine a sensor data inconsistency, but may be unable to determine which sensor is providing the inaccurate sensor data. In such cases, the techniques described herein for determining the cause of the sensor data inaccuracy and/or responding to the sensor data inaccuracy may be performed for multiple sensors including any or all of the sensors associated with the sensor data inconsistency.

At operation 122, the perception component 114 may determine one or more causes of the inconsistency determined between the sensor data of the different sensors 104. As described above, a sensor data inconsistency within an overlapping region of multiple sensors fields of view may indicate that at least one of the sensors is provided inaccurate data. Any number of causes may be associated with or responsible for a sensor providing inaccurate data, including natural causes based on environmental factors, sensor occlusion by objects in the environment, internal sensor malfunctions, and/or international or unintentional inference with sensors by agents or other objects in the environment. For example, natural causes of sensor data inaccuracies may include sensor obstructions (e.g., dirt, mud, rain drops, snow, or other material on a lens of a sensor) and/or environmental conditions (e.g., optical flares, fog, rain, snow, exhaust, etc.). Internal sensor errors or malfunctions may include, for example, focusing errors, damage to sensor lenses, mounts, or to other sensor parts, errors in sensor data capture or processing software, network errors affecting sensor data transmission, etc. Sensor occlusions may include situations in which the field of view of at least one sensor 104 of the vehicle 102 is partially or fully blocked by an object (e.g., a vehicle, tree branch, street sign, etc.). In some examples, perception component 114 may initially determine that the perceived inconsistencies between the sensor data of the different sensors are not caused by such occlusions. For instance, the perception component 114 may use trained ML models to detect the presence of occlusions affecting specific sensors, and may restrict the analysis of sensor data inconsistencies to non-occluded overlapping regions.

When a sensor data inaccuracy is caused by agents and/or other objects in the environment interfering with the operation of the sensors 104, the interference can be intentional or unintentional. For instance, other vehicles, emergency vehicles, construction machines, and roadside objects may unintentionally interfere with the proper operation of a sensor 104 on the vehicle 102. Such objects may emit unusual and/or large amounts of light, heat, energy, noise, smoke, steam, and the like, that may interfere with the sensors 104. Intentional actions to interfere with the sensors 104 may include, for example, vandalism or other malicious acts targeting an individual sensor 104, a sensor cluster or pod, or the vehicle 102 itself. For instance, a pedestrian or bicyclist near the vehicle 102 may secure (e.g., affix) a sticker to a sensor 104, or may place an object such as a bucket or plastic bag over a sensor pod. Malicious agents also may spray paint (or another substance from a spray bottle or aerosol dispenser) onto the vehicle 102, throw objects (e.g., rocks, mud, paint, etc.) onto the vehicle 102, or may target sensors on the vehicle 102 with flashlights, laser pointers, heat rays, etc., to disable the sensors 104. Additional examples of sensor interference may be benign or accidental actions performed by agents, such as agents or objects that use camouflage techniques (e.g., visual camouflage, and/or absorbent materials that are not detectable by lidar or radar) that may prevent detection by certain sensors 104, and/or signs or advertisements that use holographic projection and/or 3D painting/printing to cause optical illusions that may result in false positive object detections.

The perception component 114 may use a number of techniques described herein, individually or in combination, to determine one or more causes for a sensor inaccuracy (e.g., sensor data inconsistency). In some examples, the perception component 114 may use trained machine-learned (ML) models to detect specific objects that may cause or be associated with the cause of a sensor inaccuracy. Examples of techniques for training and using ML models to detect specific objects in a driving environment can be found, for example, in U.S. patent application Ser. No. 17/554,378, filed Dec. 17, 2021, and titled "Object Destination And Trajectory Prediction Based On Semantic Features," and in U.S. patent application Ser. No. 17/710,530, filed Mar. 31, 2022, and titled "Prediction Models In Autonomous Vehicles Using Modified Map Data," both of which are incorporated by reference herein, in their entirety, for all purposes. Using the same or similar techniques, the perception component 114 may execute trained ML models configured to detect pedestrians or cyclists holding specific objects, such as laser pointers, flashlights, buckets, plastic bags, rocks, paint, stickers, etc., while they are approaching or in the vicinity of the vehicle 102. Additional ML models may be trained to detect natural or benign potential causes of sensor data inaccuracies, such as rain or mud puddles in the path of the vehicle, nearby emergency vehicles or construction equipment, 3D crosswalks or street art, holographic projectors, etc.

In some examples, the perception component 114 may use ML models in conjunction with heuristics based on the locations and/or movement of the detected objects relative to the vehicle 102, and the timing of the observed sensor data inaccuracies. Based on the detection of a potential cause of a sensor data inaccuracy, and the correlation of the potential cause with the affected sensors, the type of sensor data inaccuracy (e.g., degraded, occluded, and/or corrupted sensor data), and the duration of the sensor data inaccuracy, the perception component 114 may use the heuristics to determine a likely cause of the sensor data inaccuracy. For example, when the perception component 114 uses an ML model to detect a pedestrian holding a sticker ten meters away from the vehicle 102, that might be insufficient to determine the pedestrian and sticker as the cause of a sensor data inaccuracy. However, when the perception component 114 detects the pedestrian walking within one meter of the vehicle 102 while holding the sticker, then walking away from the vehicle 102 no longer holding the sticker, and detects a sensor occlusion occurring at the same time and on the same side that the pedestrian passed by the vehicle 102, the perception component 114 may determine that vandalism by the pedestrian was the likely cause of the sensor occlusion.

Additional techniques that the perception component 114 may use to determine the causes of a sensor data inaccuracy may include analyzing the time and duration of the inaccuracy (e.g., start time and end point), and/or performing remedial actions to determine the responsiveness of the inaccuracy to the remedial actions. For example, initiating a cleaning process on an inaccurate sensor may resolve certain types of sensor occlusions (e.g., rain or mud), but might not resolve other types, such as stickers affixed to the sensor, laser pointers pointed at the sensor, buckets placed over the sensor, etc. Additional remedial actions that the perception component 114 may perform can include initiating an internal diagnostic/repair process on the affected sensor 104, and/or initiating a maneuver by the vehicle 102 (e.g., a small steering adjustment or minor braking action, a lane change, etc.). During and after performing these remedial actions, the perception component 114 may evaluate whether the sensor data inaccuracy persists, has been resolved, and/or has changed, and based on the responsiveness to the remedial actions the perception component 114 may determine and/or rule-out potential causes.

At operation 124, the perception component 114 may determine one or more responses for the vehicle 102 to perform, based on the sensor data inaccuracy and/or determined causes. The responses determined by the perception component 114 may be initiated and/or performed by various computing system(s) 112 of the vehicle 102, such as the vehicle control systems 116. The responsive action(s) determined by the perception component 114 may be based on the characteristics of the sensor data inaccuracy itself (e.g., the affected sensor(s), the affected objects, the affected regions in the environment, the type of sensor data degradation, etc.) as well as the determined cause(s) of the sensor data inaccuracy (if known) and confidence levels of the determined causes. In some cases, the perception component 114 may determine a single cause of a sensor data inaccuracy with a high degree of confidence, and may determine a specific response based on the cause. In other cases, the perception component 114 may determine a number of potential causes, each having a lower degree of confidence, and may determine one or more different responses based on the determine causes or potential causes.

In some examples, the perception component 114 may determine the response(s) to a sensor data inaccuracy based on whether the determined cause(s) are natural, intentional, accidental, and/or malicious. For example, when a determined cause for a sensor data inaccuracy is accidentally or unintentionally caused by an agent or machine in the environment, the perception component 114 may attempt to correct or otherwise account for the inaccuracy. For instance, the perception component 114 may request or initiate a change in the driving behavior or route determined by a planning component of the vehicle 102, such as driving more slowly or more safely, changing lanes or taking an alternate route to more quickly move away from the cause of the inaccuracy. In other examples, when the determined cause for a sensor data inaccuracy is an intentional and malicious act by an agent in the environment, the perception component 114 may perform additional actions, such as providing data regarding the cause to the planning component, so that the planning component can determine a route for the vehicle 102 that avoids both the region of the sensor data inaccuracy (e.g., the overlapping region) and the cause (which may be at a separate location). Additionally, when an intentional and/or malicious cause is determined for a sensor data inaccuracy, the perception component 114 also may control the vehicle 102 and/or sensors 104 to gather additional data relating to the cause (e.g., capturing images of a responsible individual or object, etc.). The perception component 114 may store and report incident data including the characteristics of the sensor data inaccuracy and the determined cause for further analysis, so that similar future incidents can be recognized more quickly and avoided more easily by the vehicle 102 and other vehicles in a related vehicle fleet.

In examples, the perception component 114 can characterize interference to a certain sensor or modality and, in response, may deactivate one or more sensors that are thus afflicted. The deactivation of one or more sensors may be temporary (e.g., based on time or distance based on a suspected location or time when the interference was detected). The vehicle may temporarily operate in a degraded state to remove itself from the source of interference using the remaining active sensors. In some examples, if a source of interference is detected, perception component 114 may deactivate sensors in a rolling manner that would face towards the source of interference. For example, if a source is detected and the vehicle is turning, sensors on multiple sides of the vehicle may be sequentially deactivated that are facing towards the source.

Figure 2:
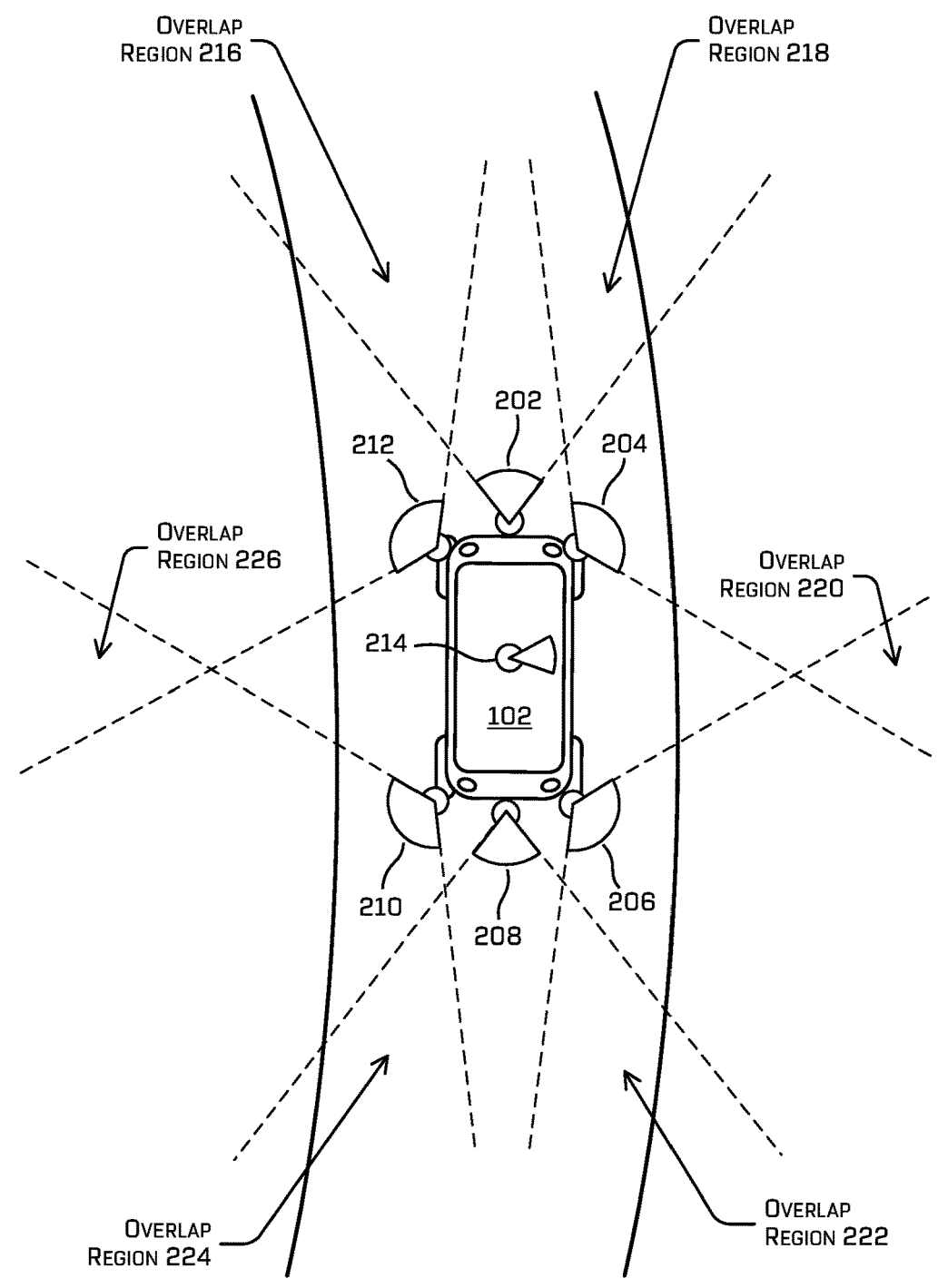
FIG. 2 illustrates an example vehicle including multiple sensors and depicting the fields of view of the sensors and overlap regions between the sensors, in accordance with one or more examples of the disclosure.

FIG. 2 shows an example of a driving environment 200 including a vehicle 102 with a number of sensors installed onto and/or integrated into the vehicle 102 at various locations. Each sensor of the vehicle 102 may have an associated sensor modality (e.g., image, lidar, radar, etc.) and various other sensor characteristics (e.g., heights, orientation angles, resolutions, ranges, etc.). Additionally, as described above, each sensor of the vehicle 102 may have an associated field of view representing the region of the environment relative to the vehicle 102 from which the sensor may detect data.

This example depicts an overhead view of the environment 200, showing six sensors (or sensor clusters/pods) 202, 204, 206, 208, 210, and 212 that are attached to the outside of the vehicle 102, and an additional sensor (or sensor cluster/pod) 214 that is mounted on the roof of the vehicle. In at least one example, each of the six side-mounted sensors 202, 204, 206, 208, 210, and 212 includes one or more short-range lidar sensors, radar sensors, and cameras, while the roof-mounted sensor 214 includes a long-range spinning lidar sensor. Greater or fewer numbers of sensors may be used in other examples, and any of the various sensors or sensor clusters may be attached to the vehicle 102 at any position and orientation angle.

As described above, each sensor may have a field of view relative to the vehicle 102. Based on the positions, orientation angles, types and configurations of the sensors, two or more sensors may have overlapping fields of view, such that the two or more sensors each capture sensor data within the same overlapping region. Dotted lines are shown in this example to depict the fields of view of each of the side-mounted sensors 202, 204, 206, 208, 210, and 212. Additionally, each of the overlapping regions within the fields of view of two of the side-mounted sensors is labeled in this example, including overlap region 216 within the fields of view of sensor 202 and sensor 212, overlap region 218 within the fields of view of sensor 202 and sensor 204, overlap region 220 within the fields of view of sensor 204 and sensor 206, overlap region 222 within the fields of view of sensor 206 and sensor 208, overlap region 224 within the fields of view of sensor 208 and sensor 210, and overlap region 226 within the fields of view of sensor 210 and sensor 212. This example depicts an overhead view of the environment 200, and thus each of the overlap regions 216-226 are shown from overhead in two dimensions. However, each of the overlap regions 216-226 also may have a height component (e.g., minimum height and maximum height) defining the vertical range of the overlap region.

The roof-mounted sensor 214 (e.g., a spinning lidar sensor) also may have a field of view that overlaps with any of the other sensors, but is not depicted in this example so as not to obscure the other lines and labels in the figure. However, overlapping regions including the field of view of the roof-mounted sensor 214 may be determined and used by the perception component 114 using similar or identical techniques. For any vehicle sensors that move (e.g., pan or rotate), the fields of view of such sensors may change relative to the vehicle 102. In such cases, the perception component 114 may determine the overlapping regions periodically (e.g., at each input/output time cycle) based on the current positions of any moving sensors, in contrast to the static overlapping regions for fixed sensors that do not move relative to the vehicle 102. As noted above, although this example depicts a vehicle 102 with seven sensors, any number of different sensors and/or sensor types may be used in other examples, including any number of individually positioned sensors and/or sensor clusters on the vehicle 102. Additional examples of vehicles including various configurations of sensors, and various different overlapping regions between the fields of view of the sensors can be found, for example, in U.S. patent application Ser. No. 16/864,146, filed Apr. 30, 2020, and titled "Sensor Pod Coverage and Placement on Vehicle," the contents of which are incorporated by reference herein, in their entirety, for all purposes.

As noted above, one or more of the sensors 104 of the vehicle 102 may include audio sensors. In such examples, the techniques described herein also may include comparing sensor data captured by the audio sensor(s) to the sensor data from one or more of the non-audio sensors (e.g., image sensors, lidar sensors, radar sensors, etc.) to determine potential inconsistencies between the audio and non-audio sensor data. For instance, based on an analysis of the non-audio data captured by the sensors 104 (e.g., a video or image feed), the perception component 114 may determine one or more expected characteristics within the audio data captured by the audio sensors during the same time period. Examples of such situations may include video or image data (and/or lidar data, radar data, etc.) depicting an event such as the operation of a large industrial machine, an emergency vehicle with flashing lights, or an impact between objects in the environment, which should result in the audio sensors capturing corresponding audio data for the perceived event. In these examples, the "field of view" of an audio sensor may refer to the region in the environment that is in range of the audio sensors, and within which the audio sensors may perceive and capture audio data. When the audio data captured by the audio sensors does not include corresponding sounds for an event perceived by the non-audio sensors 104, the perception component 114 may determine this as an inconsistency between different vehicle sensors, representing an inaccuracy in either the audio sensors or the non-audio sensors of the vehicle 102. Similarly, when the audio data includes sound data representing an event (e.g., a collision, a siren of a nearby emergency vehicle, etc.) that is not perceived by the corresponding non-audio sensors of the vehicle 102, the perception component 114 also may determine this as an inconsistency between different vehicle sensors, representing an inaccuracy in either the audio sensors or the non-audio sensors.

Figure 3:
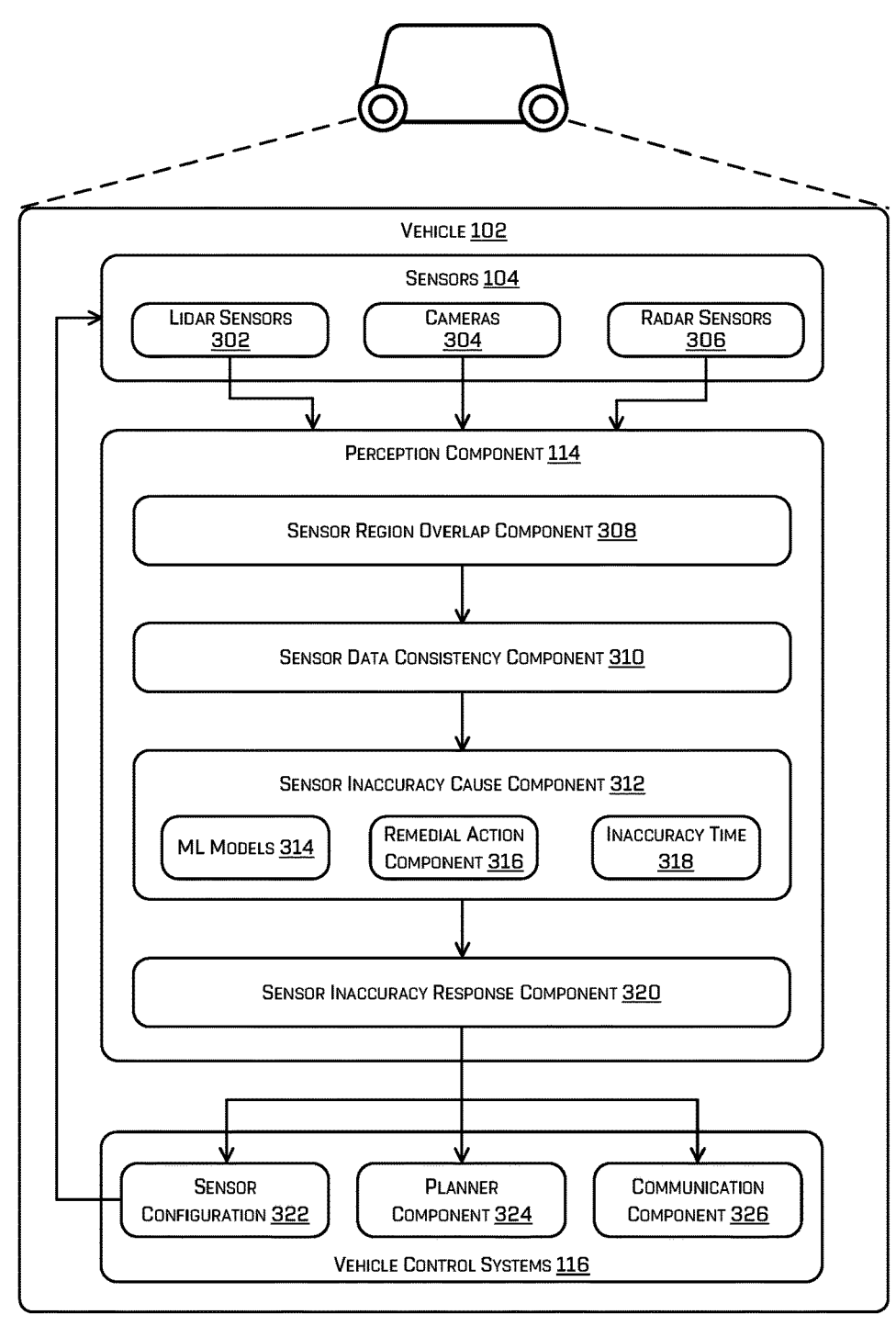
FIG. 3 illustrates example computing systems of a vehicle, including multiple sensor modalities and a perception component including subcomponents configured to determine and respond to sensor data inaccuracies, in accordance with one or more examples of the disclosure.

FIG. 3 illustrates an example system 300 including various computing systems of a vehicle 102, including various sensors 104 and a perception component 114 including subcomponents configured to determine and respond to sensor data inaccuracies. As shown in this example, the sensors 104 may include lidar sensors 302, cameras 304, and radar sensors 306. Each of the sensors 104 may be configured to provide sensor data streams (e.g., periodic transmissions of sensor data) to the perception component 114. As discussed above, the streams of lidar data, images, and/or radar data respectively provided by the lidar sensors 302, cameras 304, and radar sensors 306 may be time synchronized so that the sensor data received by the perception component 114 from different sensors represents a similar or same instance or period of time within the environment.

After receiving the time-synchronized sensor data (e.g., lidar data, image data, and radar data) from the various sensors 104 on the vehicle 102, the perception component 114 may use a number of subcomponents to detect and respond to sensor data inaccuracies in one or more of the sensors 104. As shown in this example, the perception component 114 may include a sensor region overlap component 308, a sensor data consistency component 310, a sensor inaccuracy cause component 312, and a sensor inaccuracy response component 320.

The sensor region overlap component 308 may be configured to determine the overlapping regions within the fields of view of the various sensors 104. As described above, in some examples, the overlapping regions between two or more sensors 104 may be determined off-vehicle based on the specifications and configurations of the vehicle 102 and the sensors 104. In such examples, data defining the size, shape, and location of the overlapping regions may be provided in advance to the perception component 114 and stored by the sensor region overlap component 308. In other examples, the sensor region overlap component 308 may determine the size, shape, and location of sensor overlap regions on-the-fly (e.g., during or after receiving the sensor data). For instance, when the vehicle 102 includes sensors configured to move, such as a spinning lidar, sensors that pan left-right or up-down, sensors that zoom in or out, etc., then the fields of view of the moving sensors will not be static relative to the vehicle 102. In these examples, the sensor region overlap component 308 may initially determine the current fields of view for each moving sensors 104 at a time associated with the received sensor data, and then may use the current fields of view to determine the overlapping regions with other sensors (which may include other moving sensors or stationary sensors).

The sensor data consistency component 310 may be configured to receive data defining the sensor overlap regions for groups of two or more sensors 104, and to compare the sensor data within the overlapping regions of the sensors to determine whether the sensor data is consistent or inconsistent. For example, for a pair of sensors having overlapping fields of view, the sensor data consistency component 310 may receive the size, shape, and location of the overlapping regions for each sensor. The sensor data consistency component 310 then may compare the overlapping regions of sensor data to evaluate the level of consistency within the overlapping sensor data. As described above, various techniques may be used to compare the overlapping regions of sensor data, including comparing raw sensor data and/or sensor views (e.g., labeled, multi-channel views) generated based on the sensor data. In some cases, the sensor data consistency component 310 may detect a set of objects (e.g., map data objects, and/or perceived static and dynamic objects) within the overlapping region of sensor data from a first sensor, and then may determine whether the same expected set of objects is present in the overlapping region of sensor data from a second sensor.

When comparing the sensor data in the overlapping regions, in some examples, the sensor data consistency component 310 may transform the sensor data (e.g., raw or processed data) to account for the differences in the positions, orientation angles, resolutions, and/or other characteristics of the different sensors. Additionally, in some cases, the sensor data consistency component 310 may apply a threshold so that minor differences between the sensor data in the overlapping regions can be ignored (e.g., a small speck of dirt, a minor position difference, etc.), while larger differences can be detected and analyzed (e.g., a different sets of objects, a large region of sensor interference, etc.).

As described above, this example may include analyzing sensor data from multiple sensors of the same vehicle 102, to determine consistency (or inconsistency) between the different sensor data within a similar or same time period. However, in other examples, similar or identical techniques may be used to compare sensor data captured by sensors of different vehicles (or other sensor systems) in the environment. For instance, a perception component 114 of a vehicle 102 may receive and analyze sensor data captured by a different nearby vehicle in the environment, to determine overlapping fields of view and sensor data consistency or inconsistency, using the techniques described herein.

Additionally or alternatively, the perception component 114 of the vehicle 102, and/or other sensor systems (e.g., a location monitoring system, security system, etc.) may use the techniques herein to compare sensor data from time periods that may differ significantly (e.g., by minutes, hours, or days, etc.). In such examples, the perception component 114 may distinguish between static objects (e.g., street signs, crosswalks, buildings, mailboxes, etc.) and dynamic objects in the environment (e.g., moving vehicles, pedestrians, etc.), and may analyze the overlapping regions of the sensor data from different times to determine inconsistencies in the perceived static objects, which may be indicative of a sensor data inaccuracy. In contrast, inconsistencies in the perceived dynamic objects may be expected in these examples, and thus may be ignored by the perception component 114 when the difference in the sensor data capture times is greater than a time difference threshold.

The sensor inaccuracy cause component 312 may be configured to determine the cause(s) of sensor inaccuracies detected by the sensor data consistency component 310. As discussed above, each inconsistency determined in the sensor data in the overlapping regions of different sensors may indicate that at least one of the sensors is providing inaccurate data. To determine the cause(s) of the sensor inaccuracy, the sensor inaccuracy cause component 312 may perform a number of different techniques, including but not limited to any of the techniques described above in operation 122.

For example, the sensor inaccuracy cause component 312 may execute any number of specialized ML models 314 trained to detect specific objects that may cause or be associated with the cause of a sensor inaccuracy. For instance, ML models 314 may include trained ML models that are configured to detect pedestrians or cyclists holding specific objects (e.g., laser pointers, flashlights, buckets, plastic bags, rocks, paint, stickers, etc.), trained ML models that are configured to detect occlusions (e.g., branches, street signs, vehicles or other objects that are close to the vehicle 102), and/or trained ML models that are configured to detect construction machines, emergency vehicles, advertisements, etc., that may interfere with certain vehicle sensors.

Additionally or alternatively, the sensor inaccuracy cause component 312 may initiate one or more remedial actions 316 and/or determine an inaccuracy time 318 associated with a sensor inaccuracy, to determine and evaluate the potential cause(s) of the inaccuracy. For example, the sensor inaccuracy cause component 312 may perform one or more remedial actions 316 described herein (e.g., sensor cleaning, internal diagnostic, vehicle movements, etc.), and then may evaluate the new sensor data received after the remedial action 316 was performed, in order to the determine the responsiveness of the sensor inaccuracy to the particular remedial action. Additionally, the sensor inaccuracy cause component 312 may determine and store the inaccuracy time 318 (e.g., the start time and stop time and/or duration), and may use heuristics to determine the cause(s) of the sensor inaccuracy based in part on the inaccuracy time.

The sensor inaccuracy response component 320 may be configured to determine one or more responses for the vehicle 102 to perform, based on the sensor data inaccuracy and/or the cause(s) determined by the sensor inaccuracy cause component 312. The sensor inaccuracy response component 320 may determine any number of responses, including but not limited to those described above in reference to operation 124. As described above, in some examples, the sensor inaccuracy response component 320 may determine particular response(s) to a sensor data inaccuracy based on whether the determined cause(s) are natural, intentional, accidental, and/or malicious. In various examples, the responses that the sensor inaccuracy response component 320 may determine can include requesting or initiating a change in the vehicle trajectory and/or driving route, requesting or initiating data gathering operations to capture additional sensor data associated with the sensor inaccuracy and/or the cause(s), and/or communicating data relating to the sensor inaccuracy and/or cause(s) to additional entities.

As shown in this example, after the sensor inaccuracy response component 320 determines one or more responses to perform based on the detected sensor inaccuracy and/or cause(s), the perception component 114 may initiate the responses via various other vehicle control systems 116 on the vehicle 102. The vehicle control systems 116 depicted in this example include a sensor configuration component 322, a planner component 324, and a communication component 326. However, in other examples, the vehicle control systems 116 can include any component or system on or associated with the vehicle 102.

In some cases, the sensor inaccuracy response component 320 may determine that additional data should be collected relating to the sensor inaccuracy and/or cause(s). For instance, a response to gather additional data may be determined when the characteristics of the sensor accuracy are not fully understood and/or when the cause of the inaccuracy is unknown. In these instances, the sensor inaccuracy response component 320 may determine that additional data should be collected within the environment to further assist in diagnosing the sensor inaccuracy and/or identifying the cause. In other cases, the sensor inaccuracy response component 320 may understand the sensor inaccuracy and may have identified the cause with a high degree of confidence, but nonetheless may determine to collect additional data relating to the sensor inaccuracy and/or cause for future analysis and/or incident reporting. For instance, when the cause of a sensor inaccuracy is determined to be intentional and/or malicious, the sensor inaccuracy response component

320 may attempt to capture additional images or other sensor data to identify the objects or individuals responsible for the malicious action.

When determining that additional data should be collected, the perception component 114 may transmit requests or instructions to the sensor configuration component 322 and/or planner component 324, to collect the additional data. In some examples, the instructions/requests may identify the specific locations at which to collect additional data (e.g., the overlap region, the location of a sensor data inconsistency, the location of an identified cause, etc.). The instructions/requests also may identify the specific type or characteristics of data to be collected at the identified locations (e.g., sensor modality, range, resolution, etc.). As an example, when the perception component 114 has identified an individual as the cause of the malicious sensor attack, it may request that high-resolution color images be taken of the individual.

In such examples, the planner component 324 and/or sensor configuration component 322 may be controlled individually or in combination to collect the additional requested sensor data. For example, the planner component 324 may receive one or more requested locations at which to collect data, and may maneuver the vehicle 102 to the desired range of the locations, may slow or stop the vehicle 102 and avoid obstructing objects so that high-quality sensor data may be collected of the locations, and/or may steer to orient the vehicle 102 so that the optimal sensor(s) can capture sensor data of the locations. Additionally or alternatively, the sensor configuration component 322 may receive the requested locations and/or the requested sensor data capture characteristics, and may control the sensors 104 (e.g., moving, panning, zooming, etc.), and then may activate to capture the requested sensor data of the locations.

In some examples, the sensor inaccuracy response component 320 may determine that the vehicle 102 should avoid and/or navigate away from the associated locations (e.g., sensor inaccuracy location(s) and/or locations of cause(s)). In such examples, the sensor inaccuracy response component 320 may transmit instructions/requests to the planner component 324 identifying the location(s) to avoid. In response, the planner component 324 may determine a new control trajectory and/or driving route for the vehicle 102, in order to navigate away from the locations, maintain a predetermined safe distance from the locations, etc.

As described in the above example, the sensor inaccuracy response component 320 may determine that the vehicle 102 should avoid and/or navigate away from a location associated with the sensor inaccuracy, such as the location of a malicious agent and/or object causing the sensor inaccuracy. In other examples, the sensor inaccuracy response component 320 may determine that the vehicle 102 cannot or should not navigate away from the location of an agent or other cause of the sensor inaccuracy. For instance, the sensor inaccuracy cause component 312 may be unable to determine a precise cause of the sensor inaccuracy, and/or may determine a cause (e.g., a malicious action of an agent) but may be unable to determine the location of the agent or the cause within the environment. In other instances, even when the cause of the sensor inaccuracy (e.g., an agent or object) and the location of the cause in the environment are known, the sensor inaccuracy response component 320 may determine that navigating away from the location may negatively impact the driving safety or efficiency of the vehicle 102.

In situations when the sensor inaccuracy response component 320 determines that the vehicle 102 cannot or should not navigate away from the location or agent causing the sensor inaccuracy, it may use the planner component 324 to modify the route and/or trajectory followed by the vehicle 102 within the driving environment. A number of modifications are possible to the route and/or trajectory of the vehicle 102, and the sensor inaccuracy response component 320 may determine the particular route/trajectory modification, based on determining the sensor inaccuracy itself and/or determining a particular cause of the sensor inaccuracy. For example, in response to determining that a sensor inaccuracy is caused by an action of an agent in the environment (e.g., an intentional action to disable or compromise one or more sensors 104), the sensor inaccuracy response component 320 may perform an unexpected change in course or trajectory, such as a small steering adjustment, lane change, or a small change in the braking or acceleration of the vehicle.

In some cases, the sensor inaccuracy response component 320 also may determine and initiate such responses when the cause of the sensor inaccuracy cannot be determined. In such cases, the route/trajectory modifications determined by the planner component 324 can be used as remedial actions that can be analyzed by the sensor inaccuracy cause component 312 to determine whether or not the route/trajectory modifications resolved (e.g., fixed) the sensor inaccuracy. When a minor and/or relatively quick trajectory modification (or other driving maneuver) is successful in resolving a sensor inaccuracy, the sensor inaccuracy cause component 312 may determine that the cause was directed to a particular lane or position on the driving surface, or that a malicious agent was aiming a laser or other object at the vehicle 102, etc.

Additionally or alternately, the sensor inaccuracy response component 320 may cause the planner component 324 to modify the vehicle control trajectory selected by the planner component 324, to an alternative trajectory for controlling the vehicle, based on determining that the cause of the sensor inaccuracy is an intentional or malicious agent. As an example, the planner component 324 may be configured to use a trajectory optimization algorithm, such as tree search and/or tree traversal algorithm, to determine an optimal trajectory for the vehicle to follow to traverse the environment. In tree traversal algorithms (and/or various other trajectory optimization algorithms), the planner component 324 may determine multiple possible trajectories (e.g., candidate trajectories) that the vehicle 102 could use to navigate from its current state to an intended destination state. After determining the multiple candidate trajectories, the tree traversal algorithm (or other search algorithm) may evaluate the candidates to select an optimal (e.g., lowest-cost) trajectory based on various costs and/or controls, etc. Additional examples and features relating to using tree search techniques to determine vehicle trajectories can be found, for example, in U.S. patent application Ser. No. 17/394,334, filed Aug. 4, 2021, and titled "Vehicle Trajectory Control Using A Tree Search," the contents of which are incorporated by reference herein, in their entirety, for all purposes.

In such examples, when the cause of the sensor inaccuracy is an intentional or malicious agent, the sensor inaccuracy response component 320 may modify and/or instruct the planner component 324 to select different trajectory (e.g., from among multiple possible safe trajectories) and/or to switch between trajectories for controlling the vehicle 102. In a tree traversal algorithm, for instance, the sensor inaccuracy response component 320 may instruct the planner component 324 to select a different candidate trajectory, and/or to modify the various costs used by the optimization algorithm. In some examples, the trajectory modifications determined by the sensor inaccuracy response component 320 can be random and/or non-deterministic (e.g., from among possible safe trajectories), in order to thwart or frustrate efforts of a malicious agent to characterize or predict the movements of the vehicle 102 in the environment.

In additional and/or alternative examples, the sensor inaccuracy response component 320 may determine that the vehicle 102 should transmit data relating to the sensor inaccuracy and/or cause(s) to one or more additional entities. For instance, after detecting a sensor attack from a malicious individual, or after detecting an object/road feature that causes a false positive object detection, the sensor inaccuracy response component 320 may determine that an incident report should be generated and transmitted via the communication component 326 to a remote computing device. Remote computing devices associated with the vehicle 102 and/or a fleet of associated vehicles may collect and store incident reports including the details of malicious sensor attacks and other sensor data inaccuracies. In other examples, data associated with sensor inaccuracies and/or causes may be transmitted via the communication component 326 to various other entities, such as the passengers of the vehicle 102 (e.g., an alert notifying the passengers of a delay, route change, or threat), or a remote control operator (or teleoperator) using a remote computing device to monitor or control the vehicle 102.

Figure 4A:
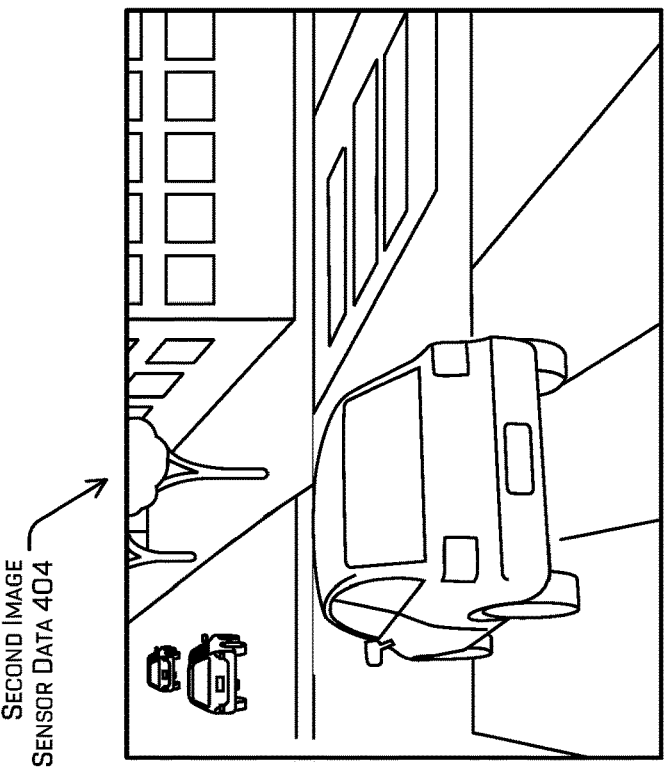
FIGS. 4A and 4B depict two examples showing inconsistencies between sensor data associated with different sensors of a vehicle, in accordance with one or more examples of the disclosure.
Figure 4A:
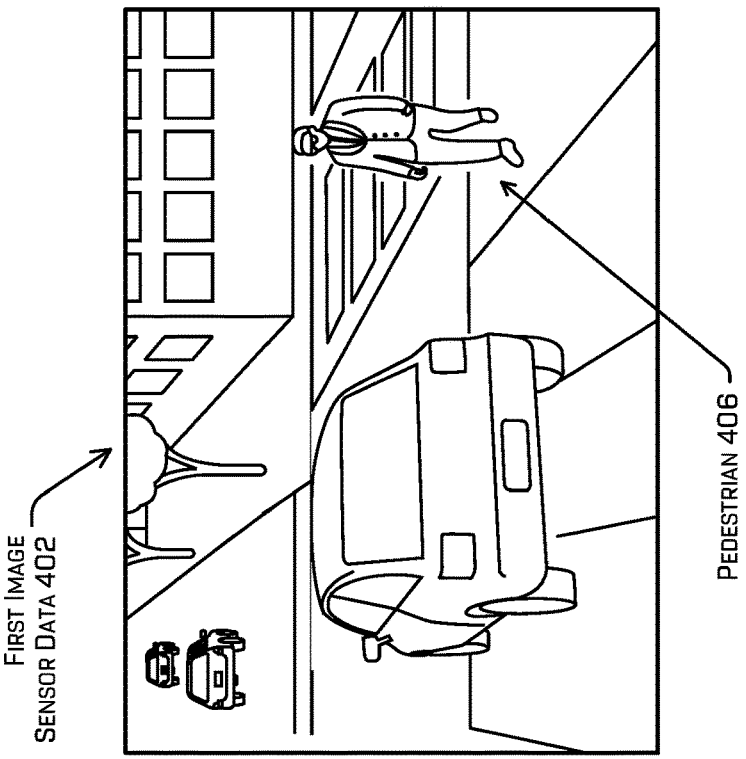
Figure 4B:
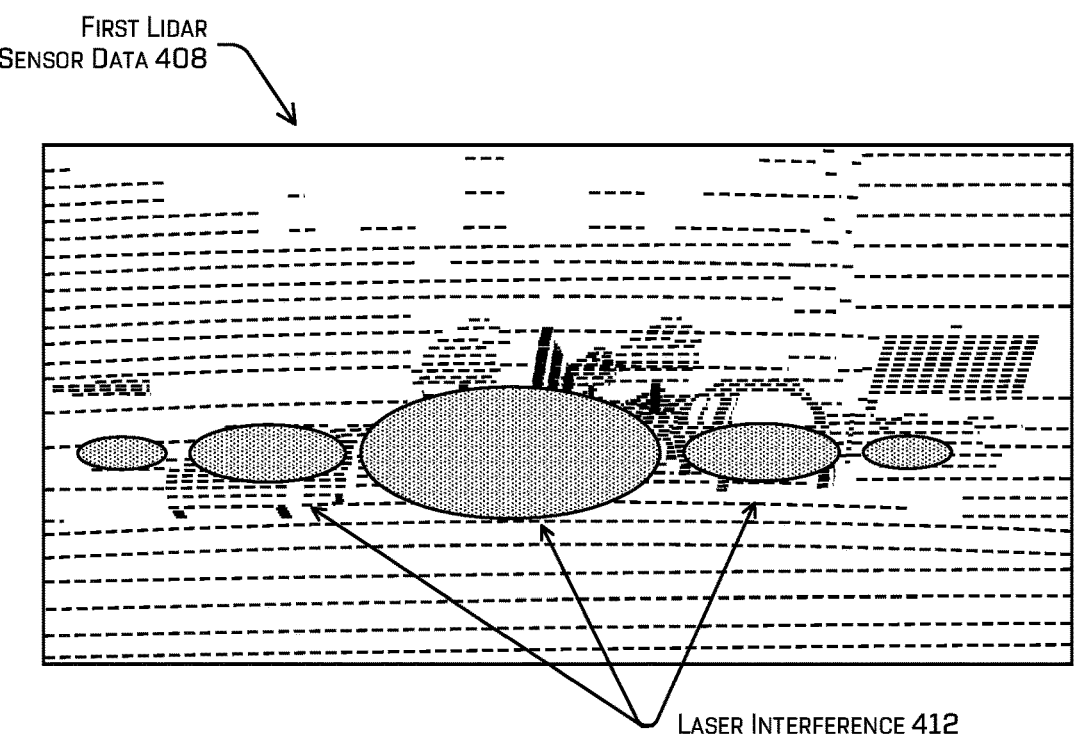
Figure 4B:
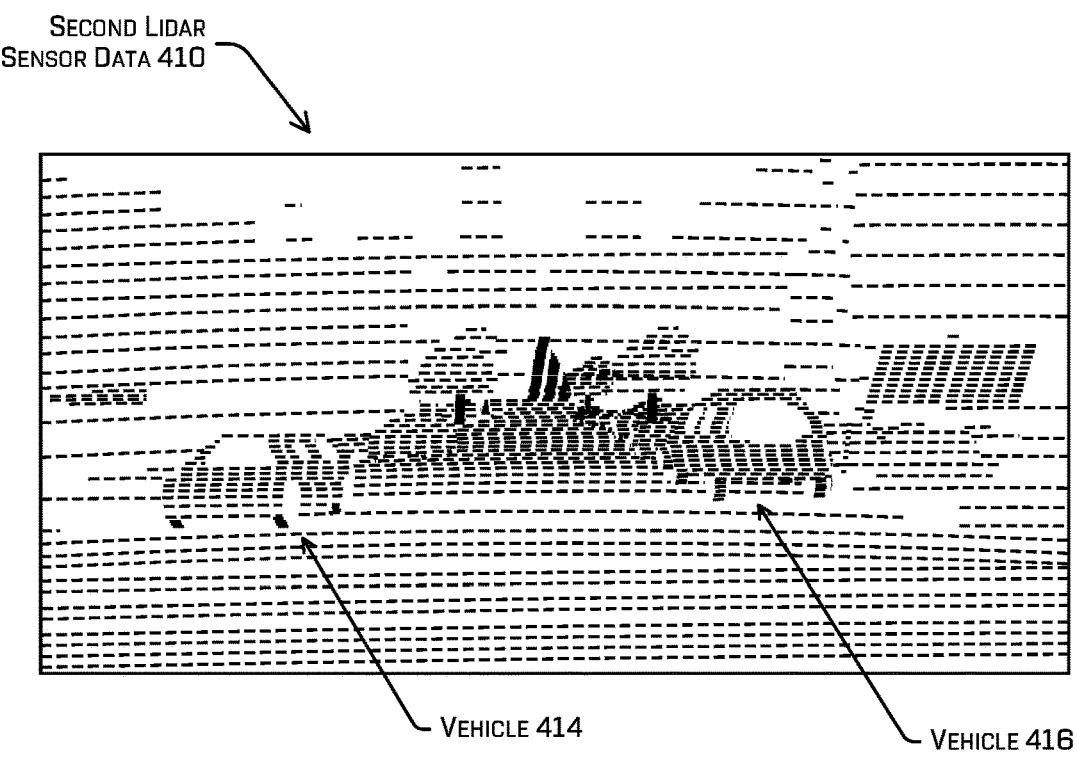

FIGS. 4A and 4B show two different examples of sensor data inconsistencies that may be detected by the perception component 114. As described above, the perception component 114 may use the sensor data consistency component 310 to determine sensor data inconsistencies by comparing the sensor data collected by different sensors 104 within the same overlapping region. Inconsistencies in the sensor data may indicate that at least one of the sensors is providing inaccurate sensor data to the perception component 114. A sensor data inaccuracy for a sensor 104 may include a false positive object detection (e.g., the sensor data representing a non-existing object) and/or a false negative object detection (e.g., the sensor data failing to represent an existing object).

FIG. 4A depicts a first example sensor data inconsistency. In this example, the perception component 114 may receive first image sensor data 402 captured by a first sensor of vehicle 102, and second image sensor data 404 captured by a second sensor having an overlapping field of view with the first sensor. As shown in this example, the illustrated portions of the first image sensor data 402 and the second image sensor data 404 may represent the overlapping region between the sensor fields of view, and the image data represents the same driving environment at the same or similar point in time. However, in this case, the sensor data consistency component 310 may determine an inconsistency in the sensor data, based on the detected pedestrian 406 within the first image sensor data 402 but not within the second image sensor data 404. As described above, this may represent either a false positive object detection by the first sensor (e.g., caused by a hologram, cardboard cutout, 3D street art, etc.), or false negative object detection by the second sensor (e.g., caused by an occlusion or other sensor interference).

FIG. 4B depicts a second example sensor data inconsistency. In this example, the perception component 114 may receive first lidar sensor data 408 (e.g., a lidar point cloud) captured by a first lidar sensor of vehicle 102, and second lidar sensor data 410 captured by a second lidar sensor having an overlapping field of view with the first lidar sensor. As shown in this example, the illustrated portions of the first lidar sensor data 408 and the second lidar sensor data 410 may represent the overlapping region between the sensor fields of view, and the lidar data represents the same driving environment at the same or similar point in time. As with the last example, the sensor data consistency component 310 may determine an inconsistency in the lidar sensor data, based on detecting a laser interference pattern 412 within the first lidar sensor data 408, which partially obscures the two vehicles 414 and 416 that are represented in the second lidar sensor data 410.

As described above, the examples of FIGS. 4A and 4B show comparisons between sensor data of the same modality (e.g., image data in FIG. 4A and lidar data in FIG. 4B). However, in other examples, the sensor data consistency component 310 may compare sensor data of different modalities, such as a first portion of an image captured by a camera and a second portion of a lidar or radar point cloud from the same overlapping region in the environment.

Figure 5A:
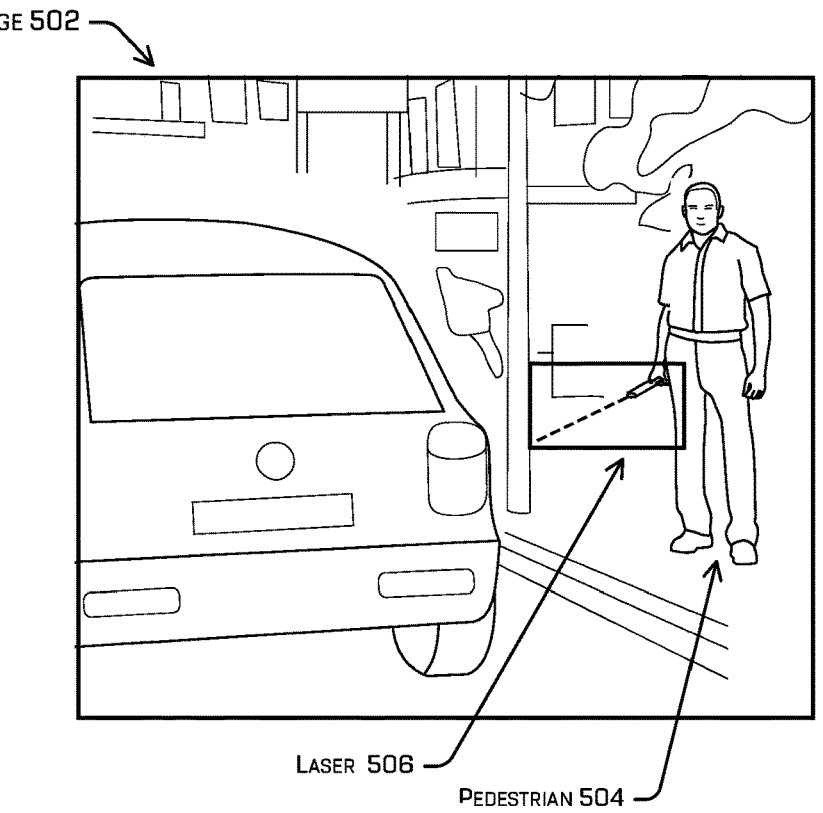
FIGS. 5A and 5B illustrate two examples using machine-learned models and/or heuristics to determine causes associated with sensor data inaccuracies, in accordance with one or more examples of the disclosure.
Figure 5B:
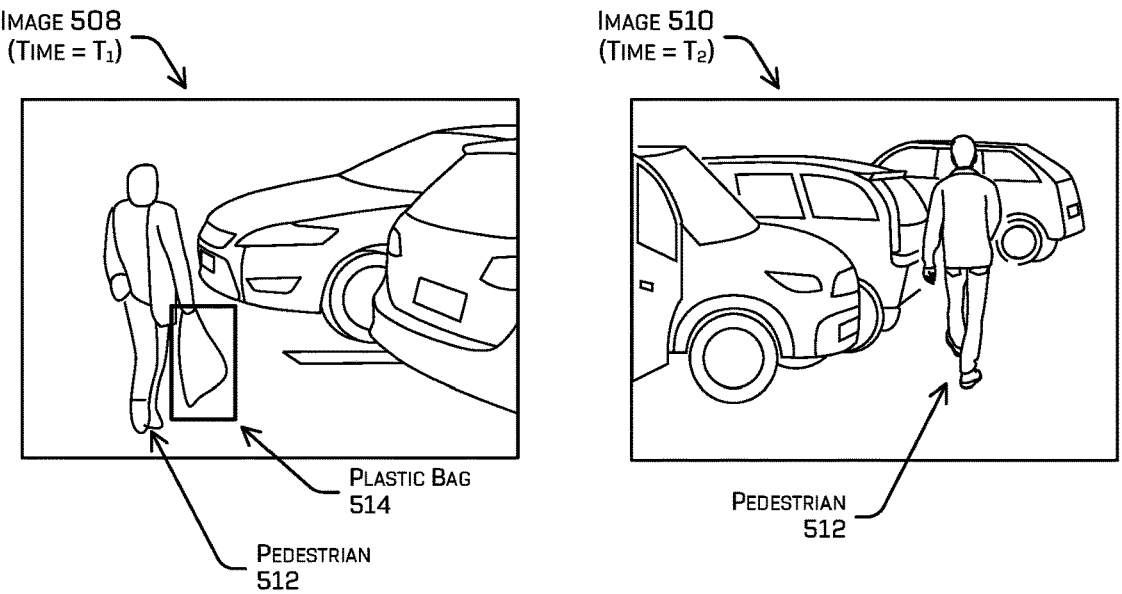

FIGS. 5A and 5B show two examples of the perception component 114 using trained ML models and/or heuristics to determine causes associated with detected sensor data inaccuracies. As described above, the perception component 114 (e.g., a sensor inaccuracy cause component 312) may use trained ML models 314 to detect specific objects causing or associated with the cause of a sensor data inaccuracy. In various examples, the specialized ML models 314 may be used to detect specific objects, either alone or being held by a person (e.g., a pedestrian or a cyclist). For instance, certain ML models 314 may be trained to detect objects such as mud puddles, snowplows, construction equipment, holographic projectors, and the like, that may unintentionally cause sensor data inaccuracies. Additional ML models 314 may be trained to detect certain objects only when they are held by a person, such as laser pointers, rocks, paint cans, beverage cups, buckets, plastic bags, stickers, etc. Further, as described above, the ML models 314 may be used in conjunction with various heuristics based on time, location, sensor inaccuracy characteristics, etc. In such examples, the perception component 114 can determine the potential causes of sensor data inaccuracies by correlating the objects detected using the ML models 314 with the timing, location, and type/characteristics of the sensor data inaccuracies.

FIG. 5A depicts a first example of using an ML model 314 to determine a potential cause of a sensor data inconsistency. In this example, the sensor inaccuracy cause component 312 may use an ML model 314 trained to detect a person holding a laser pointer within an image. As shown in this example, the image 502 does include a pedestrian 504 holding a laser pointer 506. As a result, the sensor inaccuracy cause component 312 may determine the laser pointer 506 as a potential malicious or accidental cause of a sensor data inaccuracy. Using heuristics, the sensor inaccuracy cause component 312 may further correlate the times at which the laser pointer 506 is detected with the times and characteristics of sensor data degradation and/or interference, to determine if the laser pointer 506 has caused a sensor data inaccuracy.

FIG. 5B depicts a second example of using an ML model 314 to determine a potential cause of a sensor data inconsistency. In this example, the sensor inaccuracy cause component 312 may use an ML model 314 trained to detect a person holding a plastic bag that may be used to cover a sensor 104 or sensor cluster on the vehicle 102. As shown in this example, the image 508 (captured at first time point $T_1$) does include a pedestrian 512 approaching the vehicle 102 while holding a plastic bag 514. Additionally, the image 510 (captured at subsequent time point $T_2$) show the same pedestrian 512 having moved past the vehicle 102 and no longer holding the plastic bag 514. In this case, the sensor inaccuracy cause component 312 may use heuristics to determine that a sensor data degradation occurred at or near the same time when the pedestrian 512 passed by the vehicle 102. Based on the use of the ML model 314 and correlating heuristics, the sensor inaccuracy cause component 312 may determine with a high degree of confidence that the pedestrian placed the plastic bag 514 over a sensor or sensor cluster while passing the vehicle.

Figure 6:
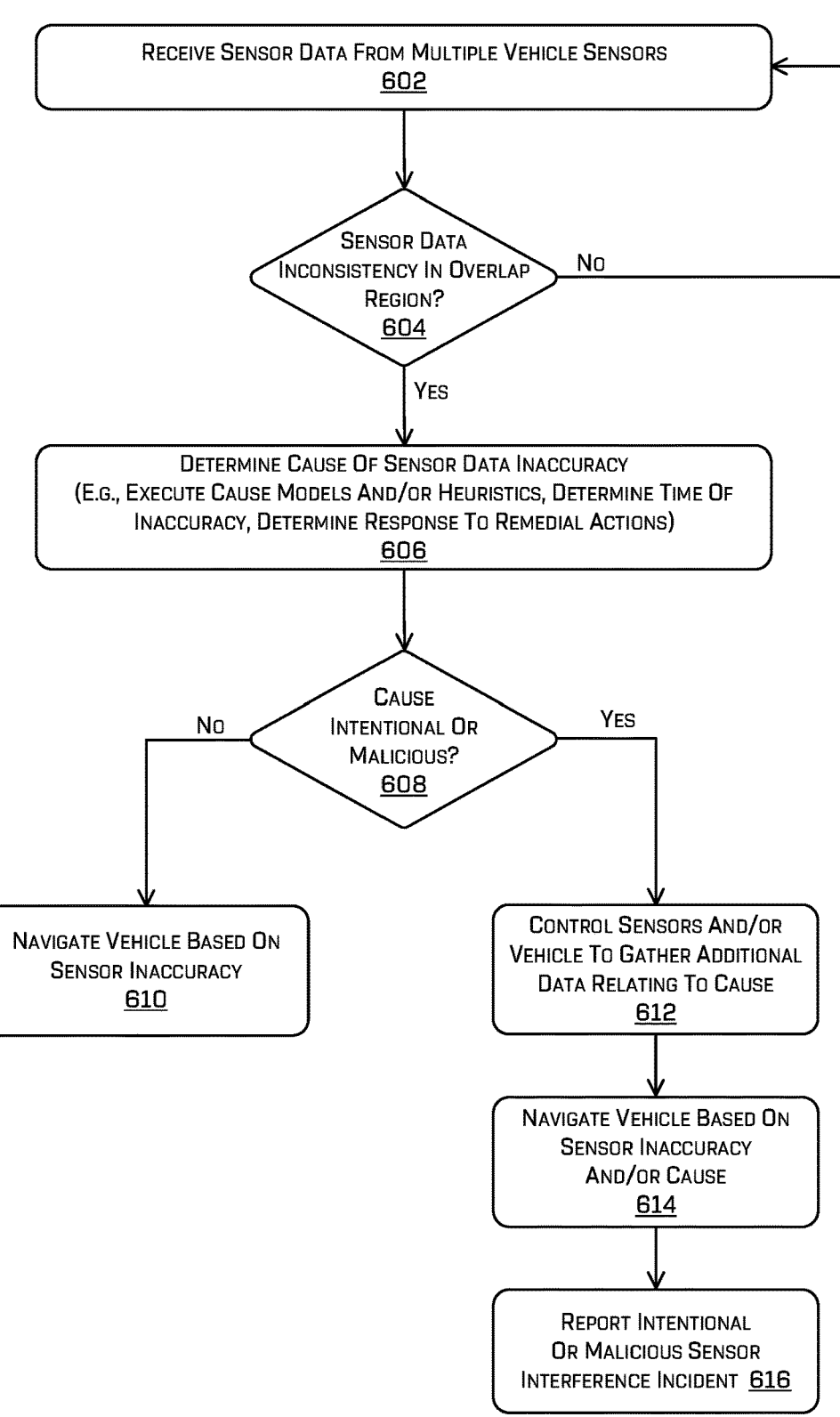
FIG. 6 is a flow diagram illustrating an example process for determining an inconsistency between sensor data from different sensors of a vehicle, determining a cause of a sensor data inaccuracy, and responding to the sensor data inaccuracy, in accordance with one or more examples of the disclosure.

FIG. 6 is a flow diagram illustrating an example process 600 for determining an inconsistency between sensor data from different sensors of a vehicle 102, determining a cause of a sensor data inaccuracy, and determining a response for the vehicle 102 to the sensor data inaccuracy. As described herein, the operations of process 600 may be performed by a perception component 114 (and/or the additional related components or subcomponents) described above in reference to FIGS. 1-5. In various examples, process 600 may be performed by a perception component 114 of a vehicle 102 including a number of vehicle control systems 116 configured to perform the determined response(s) to the sensor data inaccuracy while operating in a driving environment.

At operation 602, the perception component 114 may receive sensor data captured by multiple sensors of the vehicle 102, while operating in an environment. As described herein, the sensor data received in operation 602 may include sensor data captured by any number of sensors 104 on or associated with the vehicle 102. The sensor data may include data of a single sensor modality or multiple modalities, such as image data (e.g., image frames), lidar data (e.g., lidar point clouds), and radar data (e.g., radar point clouds), etc.), and the sensors 104 may include at least partially overlapping fields of view with other sensors. Additionally, the sensor data received from different sensors in operation 602 may represent a similar or same instance or period of time within the driving environment.

At operation 604, the perception component 114 may analyze the sensor data received in operation 602 to determine whether any inconsistencies are present between the sensor data captured by the different sensors 104. In some examples, the perception component 114 may include a sensor data consistency component 310 configured to determine the sensor overlap regions for two (or more) sensors 104, and to compare the sensor data within the overlapping regions of the sensors to detect sensor data inconsistencies. As described herein, the detection of inconsistencies between sensor data captured by different sensors 104 can be performed on raw sensor data and/or processed sensors data (e.g., labeled views), by transforming and comparing the portions of the sensor data from each sensor having overlapping fields of view with other sensors.

When one or more inconsistencies are detected in the sensor data captured by the different sensors 104 (604: Yes), then in operation 606, the perception component 114 may perform one or more techniques to determine a cause of the sensor data inaccuracy. As shown in this example, the perception component 114 may use a sensor inaccuracy cause component 312 to perform a number of different techniques to determine potential causes of the sensor data inaccuracy. Such techniques may include but are not limited to executing ML models 314 and performing associated heuristics to determine causes of sensor data inaccuracies, analyzing the start time and duration of sensor data inaccuracies, and determining the responsiveness of sensor data inaccuracies to various remedial actions.

At operation 608, the perception component 114 may analyze the determined cause (if known) of the sensor data inaccuracy, to determine whether the cause is intentional and/or malicious. For example, intentional or malicious actions that may cause the sensor data inaccuracy can include vandalism or other malicious acts by individuals targeting an individual sensor 104, a sensor cluster or pod, or the vehicle 102 itself. Such actions may include a pedestrian or bicyclist near the vehicle 102 affixing a sticker to a sensor 104, placing an object over a sensor pod, throwing objects at the vehicle 102, and/or targeting sensors 104 with laser pointers, heat rays, etc., to degrade or disable the sensors 104. In contrast, accidental or benign causes of sensor data inaccuracies may include other objects in the environment interfering with the operation of the sensors 104 (e.g., construction machines, advertisements, etc.), or natural occlusions caused by mud, rain, or low-hanging branches, etc.

In this example, when the determined cause of the sensor data inaccuracy is not intentional or malicious (608: No), then in operation 610 the perception component 114 may determine a response to the sensor data inaccuracy that includes navigating the vehicle 102 based on the sensor data inaccuracy. For example, the perception component 114 may use a sensor inaccuracy cause component 312 to determine a cause as a natural sensor occlusion, or an accidental or benign cause of a sensor degradation or interference. In such cases, the perception component 114 may initiate the determined response by transmitting a request or instruction to the planner component 324 to avoid the location of the sensor data inaccuracy and/or to drive more slowly or more safely, change lanes or take an alternate route to move away from the cause of the inaccuracy, etc.

However, when the determined cause of the sensor data inaccuracy is intentional and/or malicious (608: Yes), then in operations 612-616 the perception component 114 may determine a different response to the sensor data inaccuracy. In operation 612, the perception component 114 may request and/or instruct various vehicle control systems 116 to capture additional data relating to the malicious or intentional sensor data inaccuracy and/or the determined cause(s). As described above, the perception component 114 may determine and initiate the capture of the additional data by transmitting requests or instructions to the planner component 324 and/or sensor configuration component 322 to capture additional sensor data of the locations of the inaccuracies and/or the causes of the inaccuracies.

At operation 614, the perception component 114 also may request and/or instruct the planner component 324 to navigate the vehicle based on one or both of the detected sensor data inaccuracy and the determined cause(s). For example, the perception component 114 may transmit instructions and/or requests to the planner component 324 to avoid the various locations of the sensor data inaccuracy and any determined causes of the sensor data inaccuracies. The perception component 114 also may transmit instructions and/or requests to the planner component 324 to drive more slowly or more safely in the vicinity of the sensor data inaccuracies and/or causes.

At operation 616, the perception component 114 also may determine a response to the sensor data inaccuracy that includes reporting the detected malicious or intentional sensor data inaccuracy and/or the determined cause(s). As described above, the perception component 114 may generate and provide an incident report to a remote computing device via a communication component 326. Additionally or alternatively, the perception component 114 may determine responses that include notifications and/or alerts the passengers of the vehicle 102, and/or to a remote control operator of the vehicle 102 using a remote computing system to monitor or control the vehicle 102.

Figure 7:
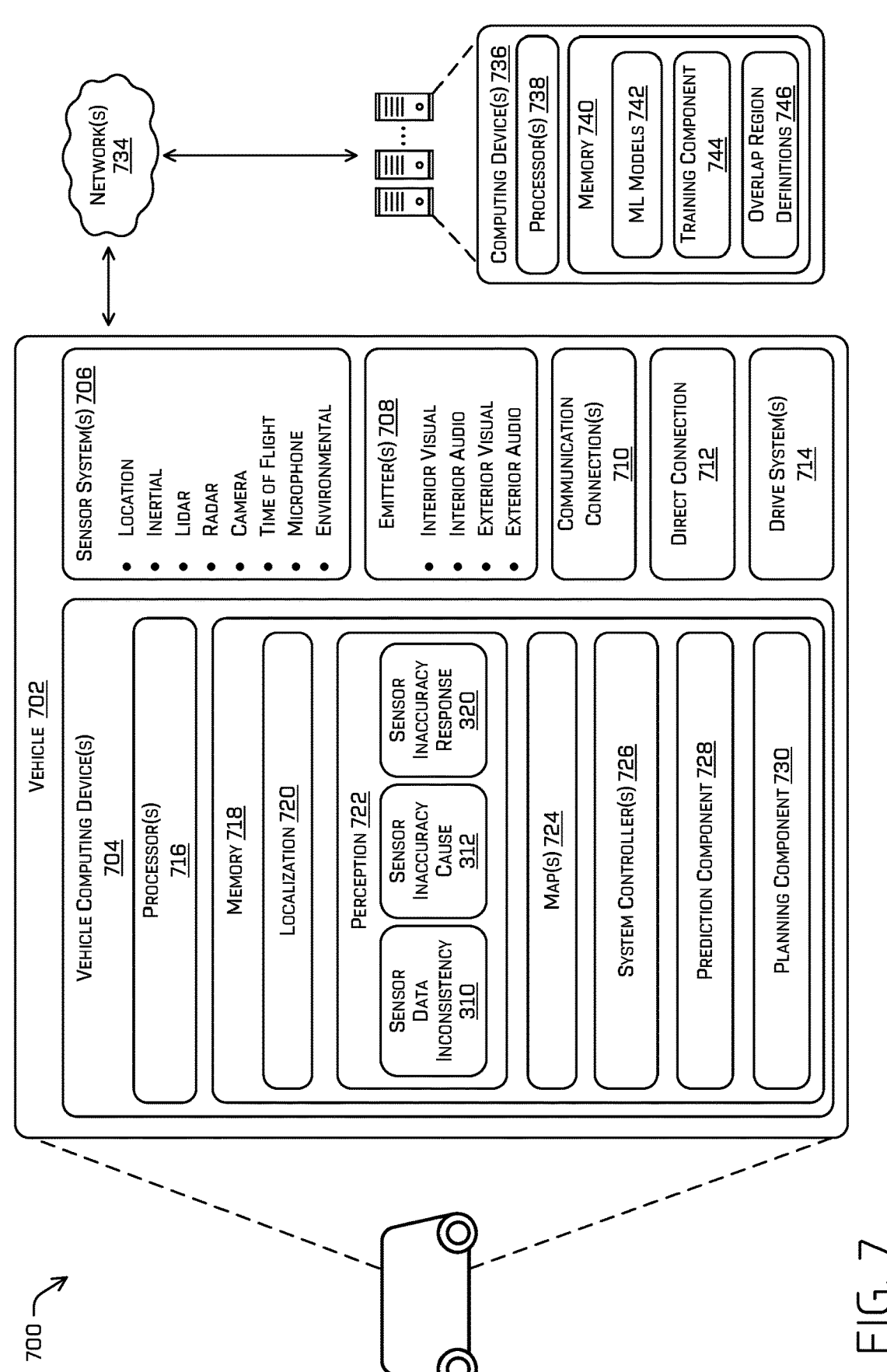
FIG. 7 depicts a block diagram of an example system for implementing various techniques described herein.

FIG. 7 depicts a block diagram of an example system 700 for implementing various techniques described herein. In some instances, the example system 700 may include a vehicle 702, which may represent the vehicle 102 discussed above in FIGS. 1-6. In some instances, the vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 702 may be a fully or partially autonomous vehicle having any other level or classification. Moreover, in some instances, the techniques described herein may be usable by non-autonomous vehicles as well. These are merely examples, and the systems and methods described herein also may be incorporated into any ground-borne, airborne, or waterborne vehicle, including those ranging from vehicles that need to be manually controlled by a driver at all times, to those that are partially or fully autonomously controlled.

The vehicle 702 which can be configured to perform various techniques described herein, including detecting sensor data inconsistencies by comparing the sensor data in overlapping regions captured by different sensors. The vehicle 702 also may be configured to determine causes of sensor data inaccuracies and/or responses by the vehicle 702 to the sensor data inaccuracies, using the various techniques described herein.

The vehicle 702 may include vehicle computing device(s) 704, sensor(s) 706, emitter(s) 708, network interface(s) 710, at least one direct connection 712 (e.g., for physically coupling with the vehicle to exchange data and/or to provide power), and one or more drive system(s) 714. In this example, the vehicle 702 may correspond to vehicle 102 discussed above. The system 700 may additionally or alternatively comprise vehicle computing device(s) 704.

In some instances, the sensor(s) 706 may include lidar sensors, radar sensors, ultrasonic transducers, sonar sensors, location sensors (e.g., global positioning system (GPS), compass), inertial sensors (e.g., inertial measurement units (IMUs), accelerometers, magnetometers, gyroscopes), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors), etc. The sensor(s) 706 may include multiple instances of each of these or other types of sensors. For instance, the radar sensors may include individual radar sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704 and/or to computing device(s) 736.

The vehicle 702 may also include emitter(s) 708 for emitting light and/or sound, as described above. The emitter(s) 708 in this example may include interior audio and visual emitter(s) to communicate with passengers of the vehicle 702. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners), and the like. The emitter(s) 708 in this example may also include exterior emitter(s). By way of example and not limitation, the exterior emitter(s) in this example include lights to signal a direction of travel or other indicator of vehicle action (e.g., indicator lights, signs, light arrays), and one or more audio emitter(s) (e.g., speakers, speaker arrays, horns) to audibly communicate with pedestrians or other nearby vehicles, one or more of which comprising acoustic beam steering technology.

The vehicle 702 may also include network interface(s) 710 that enable communication between the vehicle 702 and one or more other local or remote computing device(s). For instance, the network interface(s) 710 may facilitate communication with other local computing device(s) on the vehicle 702 and/or the drive systems(s) 714. Also, the network interface(s) 710 may additionally or alternatively allow the vehicle to communicate with other nearby computing device(s) (e.g., other nearby vehicles, traffic signals, etc.). The network interface(s) 710 may additionally or alternatively enable the vehicle 702 to communicate with computing device(s) 736. In some examples, computing device(s) 736 may comprise one or more nodes of a distributed computing system (e.g., a cloud computing architecture).

The network interface(s) 710 may include physical and/or logical interfaces for connecting the vehicle computing device(s) 704 to another computing device or a network, such as network(s) 734. For example, the network interface(s) 710 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 704 and/or the sensor(s) 706 may send sensor data, via the network(s) 734, to the computing device(s) 736 at a particular frequency, after a lapse of a predetermined period of time, in near real-time, etc.

In some instances, the vehicle 702 may include one or more drive systems(s) 714 (or drive components). In some instances, the vehicle 702 may have a single drive system 714. In some instances, the drive system(s) 714 may include one or more sensors to detect conditions of the drive system(s) 714 and/or the surroundings of the vehicle 702. By way of example and not limitation, the sensor(s) of the drive systems(s) 714 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 714. In some cases, the sensor(s) on the drive systems(s) 714 may overlap or supplement corresponding systems of the vehicle 702 (e.g., sensor(s) 706).

The drive systems(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 714 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 714. Furthermore, the drive systems(s) 714 may also include one or more communication connection(s) that enable communication by the respective drive component with one or more other local or remote computing device(s).

The vehicle computing device(s) 704 may include processor(s) 716 and memory 718 communicatively coupled with the one or more processors 716. Memory 718 may represent the memory of computing system(s) 112. Computing device(s) 736 may also include processor(s) 738, and/or memory 740. As described above, the memory 740 of the computing device(s) 736 may store and execute ML models 742, which may include similar or identical models to the ML models 314 described above, as well as a training component 744 configured to perform any combination of training functionality for the ML models 314 described herein. Additionally, the memory 740 in this example includes overlap region definitions 746, which may define the overlapping fields of view for the vehicle 702 (and/or additional vehicles in a fleet) based on the specifications of the vehicle 702 (e.g., model type, dimensions, locations of sensors and sensor clusters, etc.) and the sensors (e.g., installation location and angle, detection field sizes, detection ranges, etc.).

The processor(s) 716 and/or 738 may be any suitable processor capable of executing instructions to process data and perform operations as described herein. By way of example and not limitation, the processor(s) 716 and/or 738 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 718 and/or 740 may be examples of non-transitory computer-readable media. The memory 718 and/or 740 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 718 and/or memory 740 may store a localization component 720, perception component 722, maps 724, system controller(s) 726, prediction component 728, and/or planning component 730. As described above in reference to FIG. 3, the perception component 722 may include various additional subcomponents and systems, including a sensor data consistency component 310, a sensor inaccuracy cause component 312, and a sensor inaccuracy response component 320.

In at least one example, the localization component 720 may include hardware and/or software to receive data from the sensor(s) 706 to determine a position, velocity, and/or orientation of the vehicle 702 (e.g., one or more of an x-, y-, z-position, roll, pitch, or yaw). For example, the localization component 720 may include map(s) of an environment and can continuously determine a location, velocity, and/or orientation of the autonomous vehicle within the map(s). In some instances, the localization component 720 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 720 may provide data to various components of the vehicle 702 to determine an initial position of an autonomous vehicle for generating a trajectory and/or for generating map data, as discussed herein. In some examples, localization component 720 may provide, to the planning component 730 and/or to the prediction component 728, a location and/or orientation of the vehicle 702 relative to the environment and/or sensor data associated therewith.

The memory 718 can further include one or more maps 724 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 724 may include at least one map (e.g., images and/or a mesh) generated in accordance with the techniques discussed herein. In some examples, the vehicle 702 can be controlled based at least in part on the maps 724. That is, the maps 724 can be used in connection with the localization component 720, the perception component 722, and/or the planning component 730 to determine a location of the vehicle 702, identify objects in an environment, and/or generate routes and/or trajectories to navigate within an environment.

In some instances, the perception component 722 may comprise a primary perception system and/or a prediction system implemented in hardware and/or software. The perception component 722 may detect object(s) in in an environment surrounding the vehicle 702 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 722 may be referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 728 may include functionality to generate predicted information associated with objects in an environment. As an example, the prediction component 728 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 702 traverses an environment. In some examples, the prediction component 728 can generate one or more predicted positions, predicted velocities, predicted trajectories, etc., for such target objects based on attributes of the target object and/or other objects proximate the target object.

The planning component 730 may receive a location and/or orientation of the vehicle 702 from the localization component 720, perception data from the perception component 722, and/or predicted trajectories from the prediction component 728, and may determine instructions for controlling operation of the vehicle 702 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 726 and/or drive systems(s) 714 may parse/cause to be carried out, second instructions for the emitter(s) 708 may be formatted according to a second format associated therewith). In at least one example, the planning component 730 may comprise a nominal trajectory generation subcomponent that generates a set of candidate trajectories, and selects a trajectory for implementation by the drive systems(s) 714 based at least in part on determining a cost associated with a trajectory according to U.S. patent application Ser. No. 16/517,506, filed Jul. 19, 2019 and/or U.S. patent application Ser. No. 16/872,284, filed May 11, 2020, the entirety of which are incorporated herein for all purposes.

The memory 718 and/or 740 may additionally or alternatively store a mapping system (e.g., generating a map based at least in part on sensor data), a planning system, a ride management system, etc. Although localization component 720, perception component 722, the prediction component 728, the planning component 730, and/or system controller(s) 726 are illustrated as being stored in memory 718, any of these components may include processor-executable instructions, machine-learned model(s) (e.g., a neural network), and/or hardware and all or part of any of these components may be stored on memory 740 or configured as part of computing device(s) 736.

As described herein, the localization component 720, the perception component 722, the prediction component 728, the planning component 730, and/or other components of the system 700 may comprise one or more ML models. For example, the localization component 720, the perception component 722, the prediction component 728, and/or the planning component 730 may each comprise different ML model pipelines. The prediction component 728 may use a different ML model or a combination of different ML models in different circumstances. For example, the prediction component 728 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 718 may additionally or alternatively store one or more system controller(s) 726, which may be configured to control steering, propulsion, braking, safety, emitters, communication, and other systems of the vehicle 702. These system controller(s) 726 may communicate with and/or control corresponding systems of the drive systems(s) 714 and/or other components of the vehicle 702.

In an additional or alternate example, vehicle 702 and/or computing device(s) 736 may communicate (e.g., transmit and/or receive messages over network(s) 734) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 702. For example, the passenger device may additionally or alternatively comprise a display and/or one or more input/output devices, such as a touchscreen, microphone, speaker, and/or the like. In some examples, the vehicle 702 may transmit messages and/or receive messages from the passenger device.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

Example Clauses

A. A vehicle comprising: a plurality of sensors configured to capture sensor data of an environment external to the vehicle, the plurality of sensors including a first sensor having a first field of view relative to the vehicle and a second sensor having a second field of view relative to the vehicle, wherein the first field of view at least partially overlaps with the second field of view; one or more processors; and one or more non-transitory computer-readable media storing computer-executable instructions that, when executed, cause the vehicle to perform operations comprising: receiving first sensor data from the first sensor having the first field of view relative to the vehicle; receiving second sensor data from the second sensor having the second field of view relative to the vehicle; determining an overlapping region between the first field of view and the second field of view; determining an inaccuracy in the first sensor data, based at least in part on an inconsistency between a first portion of the first sensor data within the overlapping region and a second portion of the second sensor data within the overlapping region; determining, based at least in part on the second sensor data, a cause associated with the inaccuracy in the first sensor data, wherein determining the cause comprises determining that the inaccuracy is associated with an action of an agent in the environment; and controlling operation of the vehicle based at least in part on the cause associated with the inaccuracy.

B. The vehicle of paragraph A, wherein determining the cause associated with the inaccuracy includes at least one of: determining an emission from an object associated with the agent, the emission causing a degradation of the first sensor data; or determining an object secured to the vehicle by the agent, the object modifying at least a portion of the first field of view of the first sensor.

C. The vehicle of paragraph A, wherein determining the cause associated with the inaccuracy comprises at least one of: determining a time duration associated with the inaccuracy; or performing a remedial operation on the first sensor, based at least in part on the inaccuracy.

D. The vehicle of paragraph A, wherein controlling operation of the vehicle comprises: determining a location associated with the agent in the environment; and controlling a sensor of the vehicle to capture additional data of the location.

E. The vehicle of paragraph A, wherein controlling operation of the vehicle comprises: determining a first control trajectory for controlling the vehicle within the environment, wherein the first control trajectory was selected from a set of potential trajectories for controlling the vehicle before determining the cause associated with the inaccuracy; and based at least in part on determining that the inaccuracy is associated with the action of the agent, determining a different second control trajectory from the set of potential trajectories, for controlling the vehicle.

F. A method comprising: receiving first sensor data from a first sensor of a vehicle in an environment, the first sensor having a first field of view relative to the vehicle; receiving second sensor data from a second sensor of the vehicle, the second sensor having a second field of view relative to the vehicle; determining an overlapping region between the first field of view and the second field of view; determining an inaccuracy in the first sensor data, based at least in part on an inconsistency between a first portion of the first sensor data within the overlapping region and a second portion of the second sensor data within the overlapping region; determining a cause associated with the inaccuracy, wherein determining the cause comprises determining that the inaccuracy is associated with an action of an agent in the environment; and controlling operation of the vehicle based at least in part on the cause associated with the inaccuracy in the first sensor data.

G. The method of paragraph F, wherein determining the cause associated with the inaccuracy includes at least one of: determining an emission from an object associated with the agent, the emission causing a degradation of the first sensor data; or determining an object secured to the vehicle by the agent, the object modifying at least a portion of the first field of view of the first sensor.

H. The method of paragraph F, wherein determining the cause associated with the inaccuracy comprises at least one of: determining a time duration associated with the inaccuracy; or performing a remedial operation on the first sensor, based at least in part on the inaccuracy.

I. The method of paragraph F, wherein the inaccuracy in the first sensor data includes at least one of: a false positive object detection; or a false negative object detection.

J. The method of paragraph F, wherein the first sensor is configured to capture data of a first sensor modality, and the second sensor is configured to capture data of a second sensor modality different from the first sensor modality.

K. The method of paragraph F, wherein controlling operation of the vehicle comprises: determining a location associated with the agent in the environment; and controlling a sensor of the vehicle to capture additional data of the location.

L. The method of paragraph F, wherein controlling operation of the vehicle comprises: determining a first control trajectory for controlling the vehicle within the environment, wherein the first control trajectory was selected from a set of potential trajectories for controlling the vehicle before determining the cause associated with the inaccuracy; and based at least in part on determining that the inaccuracy is associated with the action of the agent, determining a different second control trajectory from the set of potential trajectories, for controlling the vehicle.

M. The method of paragraph F, wherein controlling operation of the vehicle comprises: determining a location associated with the agent in the environment; and determining a driving route for the vehicle, based at least in part on the location.

N. One or more non transitory computer readable media storing instructions executable by a processor, wherein the instructions, when executed, cause the processor to perform operations comprising: receiving first sensor data from a first sensor of a vehicle in an environment, the first sensor having a first field of view relative to the vehicle; receiving second sensor data from a second sensor of the vehicle, the second sensor having a second field of view relative to the vehicle; determining an overlapping region between the first field of view and the second field of view; determining an inaccuracy in the first sensor data, based at least in part on an inconsistency between a first portion of the first sensor data within the overlapping region and a second portion of the second sensor data within the overlapping region; determining a cause associated with the inaccuracy, wherein determining the cause comprises determining that the inaccuracy is associated with an action of an agent in the environment; and controlling operation of the vehicle based at least in part on the cause associated with the inaccuracy in the first sensor data.

O. The one or more non transitory computer readable media of paragraph N, wherein determining the cause associated with the inaccuracy includes at least one of: determining an emission from an object associated with the agent, the emission causing a degradation of the first sensor data; or determining an object secured to the vehicle by the agent, the object modifying at least a portion of the first field of view of the first sensor.

P. The one or more non transitory computer readable media of paragraph N, wherein determining the cause associated with the inaccuracy comprises at least one of: determining a time duration associated with the inaccuracy; or performing a remedial operation on the first sensor, based at least in part on the inaccuracy.

Q. The one or more non transitory computer readable media of paragraph N, wherein the inaccuracy in the first sensor data includes at least one of: a false positive object detection; or a false negative object detection.

R. The one or more non transitory computer readable media of paragraph N, wherein the first sensor is configured to capture data of a first sensor modality, and the second sensor is configured to capture data of a second sensor modality different from the first sensor modality.

S. The one or more non transitory computer readable media of paragraph N, wherein controlling operation of the vehicle comprises: determining a location associated with the agent in the environment; and controlling a sensor of the vehicle to capture additional data of the location.

T. The one or more non transitory computer readable media of paragraph N, wherein controlling operation of the vehicle comprises: determining a first control trajectory for controlling the vehicle within the environment, wherein the first control trajectory was selected from a set of potential trajectories for controlling the vehicle before determining the cause associated with the inaccuracy; and based at least in part on determining that the inaccuracy is associated with the action of the agent, determining a different second control trajectory from the set of potential trajectories, for controlling the vehicle.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:
a plurality of sensors configured to capture sensor data of an environment external to the vehicle, the plurality of sensors including a first sensor having a first field of view relative to the vehicle and a second sensor having a second field of view relative to the vehicle, wherein the first field of view at least partially overlaps with the second field of view;
one or more processors; and
one or more non-transitory computer-readable media storing computer-executable instructions that, when executed, cause the vehicle to perform operations comprising:
receiving first sensor data from the first sensor having the first field of view relative to the vehicle;
receiving second sensor data from the second sensor having the second field of view relative to the vehicle, wherein the second field of view comprises an overlapping region between the first field of view and the second field of view;
determining an inaccuracy in the first sensor data, based at least in part on an inconsistency between a first portion of the first sensor data within the overlapping region and a second portion of the second sensor data within the overlapping region;
determining an intent of an agent in the environment to interfere with operation of the first sensor;
determining, based at least in part on the second sensor data, a cause associated with the inaccuracy in the first sensor data, wherein determining the cause comprises determining that the inaccuracy is associated with an action of the agent and the intent of the agent in the environment to interfere with the operation of the first sensor, wherein a position associated with the agent is within at least one of the first field of view or the second field of view; and
controlling operation of the vehicle based at least in part on the cause associated with the inaccuracy, wherein controlling operation of the vehicle comprises an action of the vehicle, where the action of the vehicle is based at least in part on the intent of the agent in the environment to interfere with the operation of the first sensor.

2. The vehicle of claim 1, wherein determining the cause associated with the inaccuracy includes at least one of:
determining an emission from an object associated with the agent, the emission causing a degradation of the first sensor data; or
determining an object secured to the vehicle by the agent, the object modifying at least a portion of the first field of view of the first sensor.

3. The vehicle of claim 1, wherein determining the cause associated with the inaccuracy comprises at least one of:
determining a time duration associated with the inaccuracy; or
performing a remedial operation on the first sensor, based at least in part on the inaccuracy.

4. The vehicle of claim 1, wherein controlling operation of the vehicle comprises:
determining a location associated with the agent in the environment; and
controlling a sensor of the vehicle to capture additional data of the location.

5. The vehicle of claim 1, wherein controlling operation of the vehicle comprises:
determining a first control trajectory for controlling the vehicle within the environment, wherein the first control trajectory was selected from a set of potential trajectories for controlling the vehicle before determining the cause associated with the inaccuracy; and
based at least in part on determining that the inaccuracy is associated with the action of the agent, determining a different second control trajectory from the set of potential trajectories, for controlling the vehicle.

6. A method comprising:
receiving first sensor data from a first sensor of a vehicle in an environment, the first sensor having a first field of view relative to the vehicle;
receiving second sensor data from a second sensor of the vehicle, the second sensor having a second field of view relative to the vehicle, wherein the second field of view comprises an overlapping region between the first field of view and the second field of view;
determining an inaccuracy in the first sensor data, based at least in part on an inconsistency between a first portion of the first sensor data within the overlapping region and a second portion of the second sensor data within the overlapping region;
determining an intent of an agent in the environment to interfere with operation of the first sensor;
determining a cause associated with the inaccuracy, wherein determining the cause comprises determining that the inaccuracy is associated with an action of the agent and the intent of the agent in the environment to interfere with the operation of the first sensor, wherein a position associated with the agent is within at least one of the first field of view or the second field of view; and controlling operation of the vehicle based at least in part on the cause associated with the inaccuracy in the first sensor data, wherein controlling operation of the vehicle comprises an action of the vehicle, where the action of the vehicle is based at least in part on the intent of the agent in the environment to interfere with the operation of the first sensor.

7. The method of claim 6, wherein determining the cause associated with the inaccuracy includes at least one of:

determining an emission from an object associated with the agent, the emission causing a degradation of the first sensor data; or determining an object secured to the vehicle by the agent, the object modifying at least a portion of the first field of view of the first sensor.

8. The method of claim 6, wherein determining the cause associated with the inaccuracy comprises at least one of:

determining a time duration associated with the inaccuracy; or performing a remedial operation on the first sensor, based at least in part on the inaccuracy.

9. The method of claim 6, wherein the inaccuracy in the first sensor data includes at least one of:

a false positive object detection; or a false negative object detection.

10. The method of claim 6, wherein the first sensor is configured to capture data of a first sensor modality, and the second sensor is configured to capture data of a second sensor modality different from the first sensor modality.

11. The method of claim 6, wherein controlling operation of the vehicle comprises:

determining a location associated with the agent in the environment; and controlling a sensor of the vehicle to capture additional data of the location.

12. The method of claim 6, wherein controlling operation of the vehicle comprises:

determining a first control trajectory for controlling the vehicle within the environment, wherein the first control trajectory was selected from a set of potential trajectories for controlling the vehicle before determining the cause associated with the inaccuracy; and based at least in part on determining that the inaccuracy is associated with the action of the agent, determining a different second control trajectory from the set of potential trajectories, for controlling the vehicle.

13. The method of claim 6, wherein controlling operation of the vehicle comprises:

determining a location associated with the agent in the environment; and determining a driving route for the vehicle, based at least in part on the location.

14. One or more non-transitory computer-readable media storing instructions executable by a processor, wherein the instructions, when executed, cause the processor to perform operations comprising:

receiving first sensor data from a first sensor of a vehicle in an environment, the first sensor having a first field of view relative to the vehicle;

receiving second sensor data from a second sensor of the vehicle, the second sensor having a second field of view relative to the vehicle, wherein the second field of view comprises an overlapping region between the first field of view and the second field of view;

determining an inaccuracy in the first sensor data, based at least in part on an inconsistency between a first portion of the first sensor data within the overlapping region and a second portion of the second sensor data within the overlapping region;

determining an intent of an agent in the environment to interfere with operation of the first sensor;

determining a cause associated with the inaccuracy, wherein determining the cause comprises determining that the inaccuracy is associated with an action of the agent and the intent of the agent in the environment to interfere with the operation of the first sensor, wherein a position associated with the agent is within at least one of the first field of view or the second field of view; and controlling operation of the vehicle based at least in part on the cause associated with the inaccuracy in the first sensor data, wherein controlling operation of the vehicle comprises an action of the vehicle, where the action of the vehicle is based at least in part on the intent of the agent in the environment to interfere with the operation of the first sensor.

15. The one or more non-transitory computer-readable media of claim 14, wherein determining the cause associated with the inaccuracy includes at least one of:

determining an emission from an object associated with the agent, the emission causing a degradation of the first sensor data; or determining an object secured to the vehicle by the agent, the object modifying at least a portion of the first field of view of the first sensor.

16. The one or more non-transitory computer-readable media of claim 14, wherein determining the cause associated with the inaccuracy comprises at least one of:

determining a time duration associated with the inaccuracy; or performing a remedial operation on the first sensor, based at least in part on the inaccuracy.

17. The one or more non-transitory computer-readable media of claim 14, wherein the inaccuracy in the first sensor data includes at least one of:

a false positive object detection; or a false negative object detection.

18. The one or more non-transitory computer-readable media of claim 14, wherein:

the first sensor is configured to capture data of a first sensor modality, and the second sensor is configured to capture data of a second sensor modality different from the first sensor modality.

19. The one or more non-transitory computer-readable media of claim 14, wherein controlling operation of the vehicle comprises:

determining a location associated with the agent in the environment; and controlling a sensor of the vehicle to capture additional data of the location.

20. The one or more non-transitory computer-readable media of claim 14, wherein controlling operation of the vehicle comprises:

determining a first control trajectory for controlling the vehicle within the environment, wherein the first control trajectory was selected from a set of potential trajectories for controlling the vehicle before determining the cause associated with the inaccuracy; and based at least in part on determining that the inaccuracy is associated with the action of the agent, determining a different second control trajectory from the set of potential trajectories, for controlling the vehicle.

\* \* \* \* \*